US008172669B2

(12) United States Patent
Barker et al.

(10) Patent No.: US 8,172,669 B2
(45) Date of Patent: May 8, 2012

(54) WAGERING GAME SYSTEM HAVING ELECTRO-OPTICAL ASSEMBLY WITH VARIABLE OPACITY

(75) Inventors: Paul Barker, Chicago, IL (US); Jacob C. Greenberg, Elgin, IL (US); Scott Minch, Wheeling, IL (US)

(73) Assignee: WMS Gaming Inc., Waukegan, IL (US)

( * ) Notice: Subject to any disclaimer, the term of this patent is extended or adjusted under 35 U.S.C. 154(b) by 289 days.

(21) Appl. No.: 12/599,825

(22) PCT Filed: May 7, 2008

(86) PCT No.: PCT/US2008/005837
§ 371 (c)(1),
(2), (4) Date: Nov. 12, 2009

(87) PCT Pub. No.: WO2008/143781
PCT Pub. Date: Nov. 27, 2008

(65) Prior Publication Data

US 2010/0248808 A1 Sep. 30, 2010

Related U.S. Application Data

(60) Provisional application No. 60/930,301, filed on May 15, 2007, provisional application No. 61/000,565, filed on Oct. 26, 2007.

(51) Int. Cl.
*G06F 17/00* (2006.01)

(52) U.S. Cl. .......................................................... 463/20

(58) Field of Classification Search .............. 463/16–25, 463/31, 34

See application file for complete search history.

(56) References Cited

U.S. PATENT DOCUMENTS

| | | | | |
|---|---|---|---|---|
| 7,160,187 | B2 | 1/2007 | Loose et al. | |
| 8,012,010 | B2 * | 9/2011 | Wilson et al. | 463/20 |
| 2002/0173354 | A1 * | 11/2002 | Winans et al. | 463/20 |
| 2004/0171423 | A1 | 9/2004 | Silva et al. | |
| 2004/0192430 | A1 * | 9/2004 | Burak et al. | 463/20 |
| 2006/0166727 | A1 * | 7/2006 | Burak | 463/16 |
| 2008/0113736 | A1 | 5/2008 | Shackelford et al. | |
| 2009/0312095 | A1 * | 12/2009 | Durham et al. | 463/30 |

OTHER PUBLICATIONS

Written Opinion corresponding to co-pending International Patent Application Serial No. PCT/US2008/005837, United States Patent Office; dated Aug. 26, 2008; 6 pages.

International Search Report corresponding to co-pending International Patent Application Serial No. PCT/US2008/005837, United States Patent Office; dated Aug. 26, 2008; 2 pages.

(Continued)

*Primary Examiner* — Ronald Laneau
(74) *Attorney, Agent, or Firm* — Nixon Peabody LLP

(57) ABSTRACT

A gaming system includes a cabinet having an electro-optical assembly including a substrate and a layer having a variable opacity. Also included in the gaming system is a first input device for receiving a wager from a first player and a second input device for receiving a wager from a second player, as well as at least one video display for displaying video images relating to a wagering game. A controller is electrically coupled to the layer having a variable opacity and is programmed to alter the opacity of the layer to allow the first player to view the video images reflected from the at least one display.

30 Claims, 18 Drawing Sheets

OTHER PUBLICATIONS

International Preliminary Report on Patentability corresponding to co-pending International Patent Application Serial No. PCT/US2008/005837, United States Patent Office; dated Aug. 27, 2009; 3 pages.

Go From Public to Full Privacy with a Flip of a Switch, http://www.switchlite.com/home.html, printed Nov. 9. 2009.

The Systems Behind the Glass®, http://www.spdcontrolsystems.com.spdglass.htm, printed Nov. 9, 2009.

* cited by examiner

WAGERING GAME SYSTEM HAVING ELECTRO-OPTICAL ASSEMBLY WITH VARIABLE OPACITY

CROSS-REFERENCE TO RELATED APPLICATIONS

This application is a U.S. National Stage of International Application No. PCT/US2008/005837, filed May 7, 2008, which claims the benefit of U.S. Provisional Application No. 60/930,301, filed on May 15, 2007, and U.S. Provisional Application No. 61/000,565, filed on Oct. 26, 2007, all of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all rights whatsoever.

FIELD OF THE INVENTION

The present invention relates generally to gaming machines, and methods for playing wagering games, and more particularly, to a wagering game system that allows players to see and interact with each other through a generally transparent medium that may be electrically altered to change its transmissive properties.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

To provide additional excitement and appeal, it is also attractive to provide players with community gaming experiences that allow them to interact with other players while they are playing at a gaming machine. To that end, it is desirable to have gaming systems and features that contribute to the enhanced sense of community game play.

SUMMARY OF THE INVENTION

According to one aspect of the present invention, a gaming system includes a cabinet, a first input device for receiving a wager from a first player and a second input device for receiving a wager from a second player. The gaming system also includes at least one video display for displaying video images relating to a wagering game and an electro-optical assembly in the cabinet. The electro-optical assembly includes a substrate and a layer having a variable opacity. The gaming system further includes a controller electrically coupled to the layer and programmed to alter the opacity of the layer to allow the first player to view the video images reflected from the at least one display. the controller can further be programmed to alter the opacity of the layer such that the video images from the first video display and the second video display are superimposed relative to the substrate to allow viewing of the video images by the players.

According to another aspect of the invention, a method of conducting a wagering game on a gaming system includes the acts of providing a first gaming machine for receiving a wager from a first player and a second gaming machine for receiving a wager from a second player. The method further includes interposing an electro-optical assembly between the first and second gaming machines, the electro-optical assembly including a substrate and a layer having variable opacity, electronically coupling a controller to the layer and programming the controller to vary the opacity of the layer for displaying video images of a wagering game relative to the substrate. The interposing can include orienting the electro-optical assembly at an angle between first gaming machine and the second gaming machine. The opacity of the layer may also be varied such that the first player is able to view the second player through the screen and vice versa. The electro-optical assembly can be a transmissive display.

According to yet another aspect of the invention, a computer readable storage medium is encoded with instructions for directing a gaming system to perform the above method.

According to a further aspect of the invention, a gaming system includes a linked set of gaming machines being operable to receive wagers from players. The linked set of gaming machines includes a signage in communication with the gaming machines. The gaming system further includes a controller operative to control the signage to allow players at the linked set of gaming machines to view players at the other linked gaming machines through the signage and to superimpose video images on the signage corresponding to a community wagering game.

According to another aspect of the invention, a multi-player gaming system comprises a cabinet, a first input device for receiving a wager from a first player and a second input device for receiving a wager from a second player. The system further includes at least one video display for displaying video images relating to a wagering game. An electro-optical assembly in the cabinet comprises a substrate and a layer having a variable opacity, the electro-optical assembly being positioned to permit the video images displayed from the at least one video display to be viewable relative to the layer. A viewable surface of the electro-optical assembly includes a plurality of variable zones, including a first zone adjacent to a second zone. The system further includes a controller programmed to alter the opacity of the layer corresponding to the first zone separately from the opacity of the layer corresponding to the second zone. The layer can be positioned to reflect the video images displayed from the at least one video display. At least one video image can be viewable on opposite sides of the electro-optical assembly. The video image that is viewable on one side of the electro-optical assembly can be viewable as a reversed image on the opposite side of the electro-optical assembly. The video image can include a number or letter, and the controller can be programmed to alter the opacity of a portion of the layer corresponding to the location of the number or letter to opaque while other portions of the layer remain transparent such that the number or letter is displayed in the same orientation on both sides of the electro-optical assembly. The layer may also be altered by the controller to render at least a portion of the viewable surface of the electro-optical assembly opaque. The portion of the viewable surface can be associated with a losing or inactive wagering game. The first zone can also be side-by-side the second zone. The gaming system can also include a third input device for receiving a wager from a third player and a fourth input device for receiving a wager from a fourth player. The first player can be situated opposite the third player and the second player can be situated opposite the fourth player such that the first player and the second player are situated on one side of the cabinet and the third player and the fourth player are situated on the other side of the cabinet. The electro-optical assembly can span across a width of the cabinet so that the first player and the third player are visible to one another when the layer is transparent and the second player and the fourth player are visible to one another when the layer is transparent.

According to another aspect of the invention, a gaming system comprises a cabinet, a first input device for receiving a wager from a first player, a second input device for receiving a wager from a second player and at least one video display for displaying video images relating to a wagering game. The gaming system also includes an electro-optical assembly in the cabinet. The electro-optical assembly comprises a substrate and a layer having a variable opacity, the layer being positioned to permit the video images displayed from the at least one video display to be viewable relative to the layer. The gaming system further includes a controller programmed to alter the opacity of the layer to allow the first player and the second player to view the video images displayed by the at least one display, and wherein at least one video image related to the wagering game is viewable simultaneously by the first player and the second player when they are on opposite sides of the electro-optical assembly, and wherein the first player and the second player can interact directly with the at least one video image related to the wagering game. The video images can be viewable by the first player on one side of the electro-optical assembly are can also be viewable simultaneously by the second player on the opposite side of the electro-optical assembly. The first player and the second player can input a secondary wager based on the mutual interaction with the video image. The interaction of the first player and the second player with the video image can cause an outcome in the wagering game that is only achievable based on the interaction. The controller can also be further programmed to alter the opacity of the layer to render at least a portion of the layer opaque. The first input device, the second input device, the a video display and the electro-optical assembly can be housed within the cabinet.

A method of conducting a multi-player wagering game comprises receiving a wager from a first player of the wagering game and receiving a wager from a second player of the wagering game. The method also comprises varying, via a controller, an opacity of a layer of an electro-optical assembly to render the layer between opaque and transparent and displaying at least one video image relative to the layer such that the at least one video image is visible through the layer to the first player and to the second player. The method further comprises receiving an input from the first player indicative of a selection related to the wagering game by the first player and receiving an input from the second player indicative of the selection by the second player. The selection can include an alphanumeric character and the varying can include rendering the opacity of a portion of the layer opaque at the location of the selection and causing the alphanumeric character to be displayed on opposite sides of the electro-optical assembly in non-reversed order. The method can also include rendering the opacity of a majority of the layer transparent in response to the first player or the second player achieving an award during the wagering game to permit the first player and the second player to see through the layer each other as well as video images relating to the award, the video images being displayed relative to the layer.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
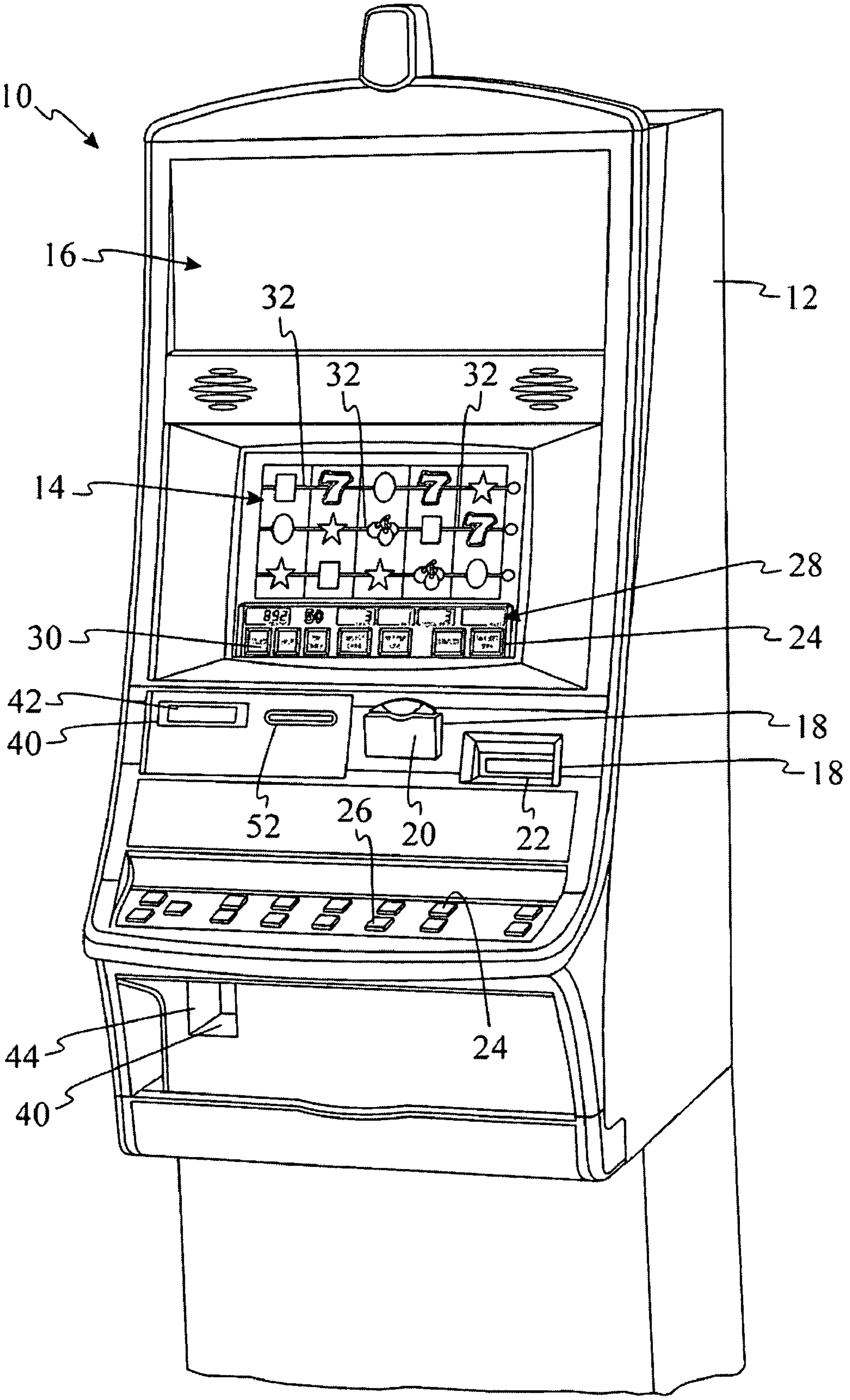
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
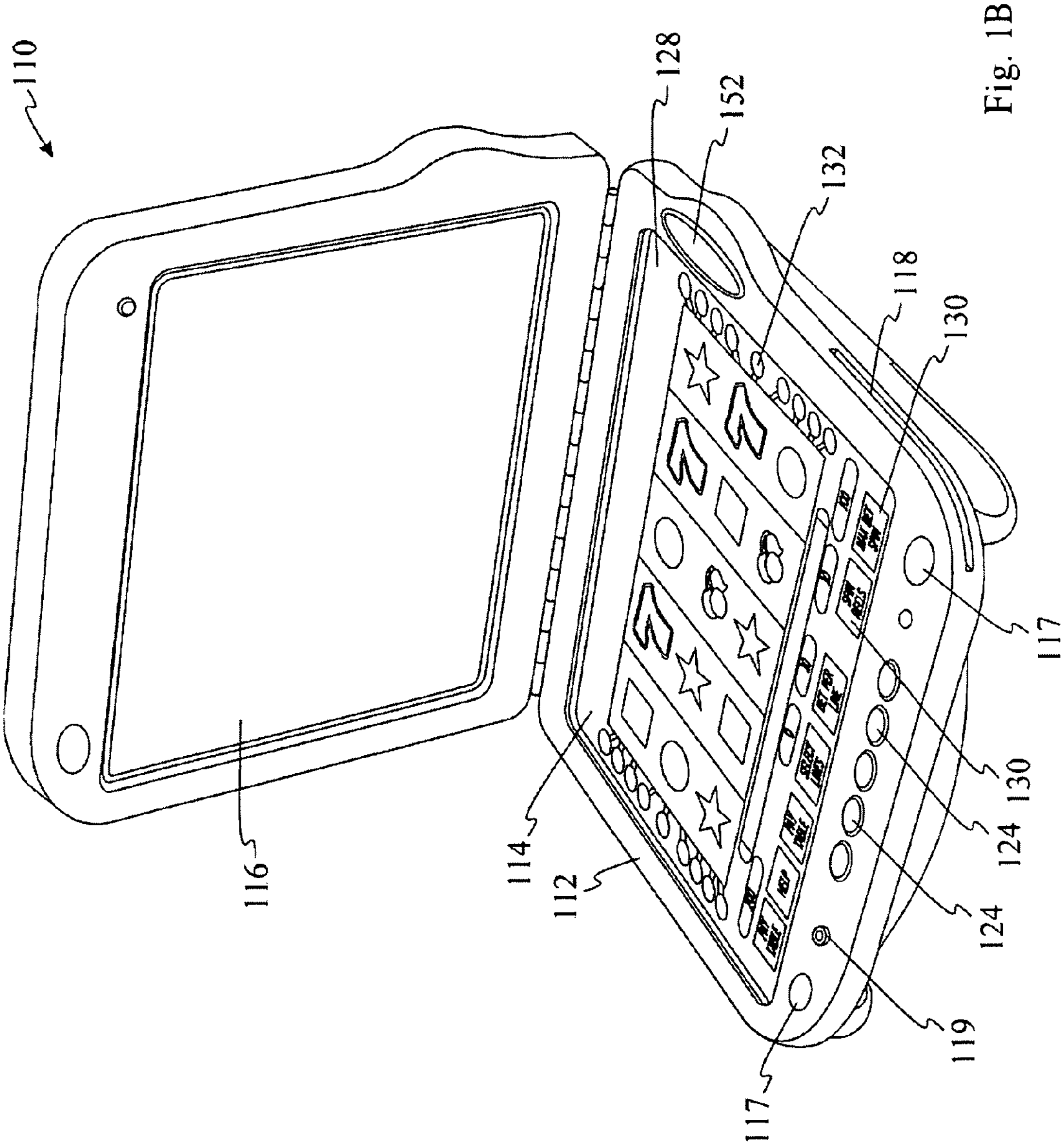
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
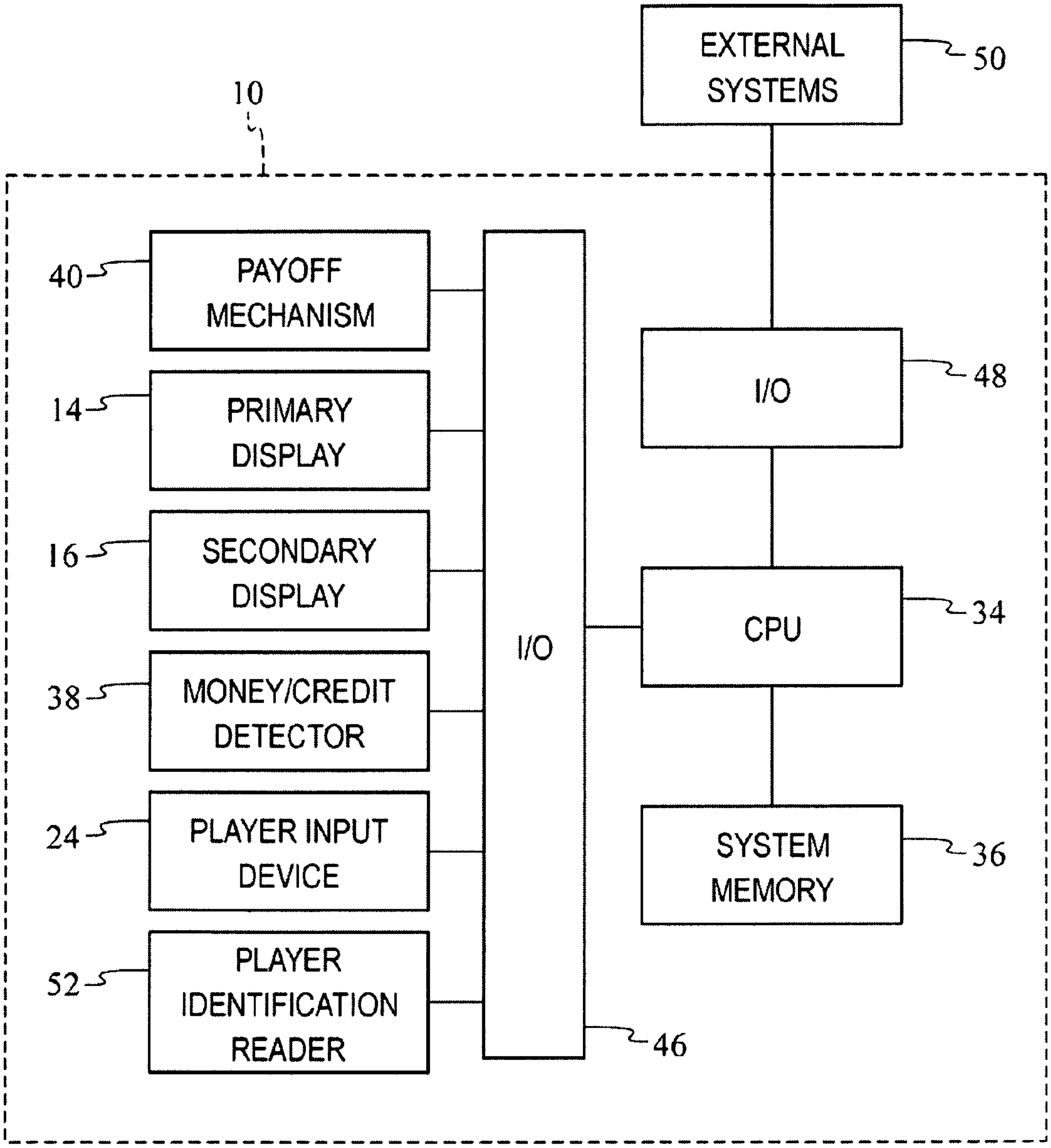
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside' of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

Figure 3:
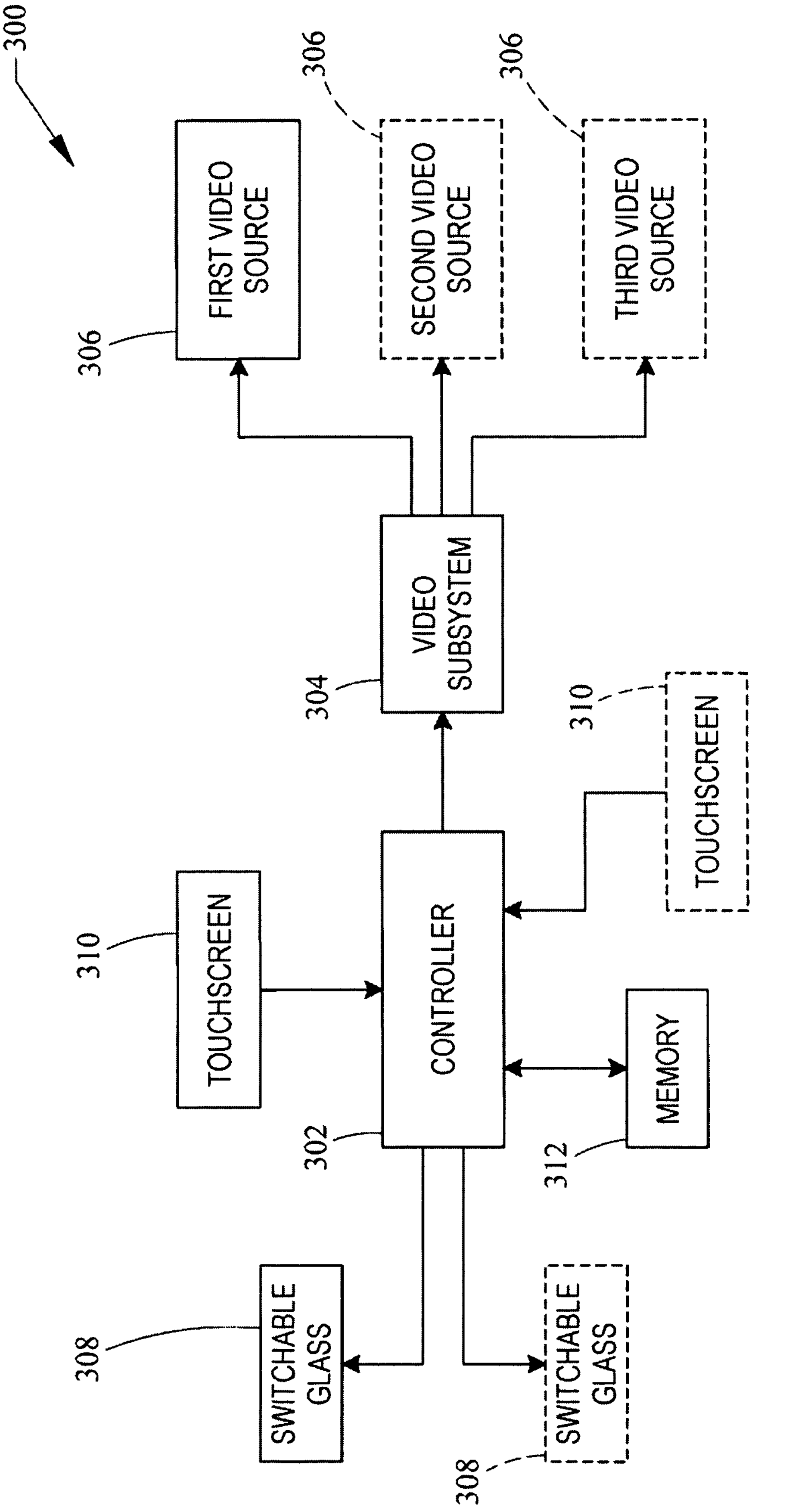
FIG. 3 is a block diagram of a control system suitable for operating the electro-optical assembly of the present invention.

Turning to FIG. 3, a control system 300 is shown that is suitable for operating the electro-optical assembly of the present invention. A controller 302 is connected to, and controls, a video subsystem 304, one or more video sources 306, an electro-optical assembly 308 and a memory 312. The electro-optical assembly 308, which may include a substrate and a variable opacity layer, may be electrically altered by the controller 302 to change its transmissive properties. One example of such an electro-optical assembly 308 is a switchable glass whose transmissive properties can be electrically varied, i.e. from transparent to opaque. More than one electro-optical assembly 308 may be electrically coupled to the controller 302. Optionally, a touchscreen 310 may also be coupled to the controller 302 for receiving player selections. In some embodiments, when the electro-optical assembly 308 is transparent or translucent, selections via the touchscreen 310 may be viewed by other players while the selections are being made. The details of these features will be described in more detail below.

In some embodiments, a transmissive display (not shown) may be connected to the controller 302 that may operate to display video images on the transmissive display instead of or in addition to displaying video images relative to the electro-optical assembly 308. A transmissive display is essentially a transparent video display that is superimposed over a display. The video images displayed on the transmissive display may include translucent portions such that the underlying display is visible, but in an altered state (i.e., different color, texture, etc.). The video images may also include opaque portions so as to completely block out parts of the underlying display.

Turning now to FIGS. 4-8, these drawings illustrate a two-player gaming system. In an embodiment, the two-player gaming system includes two gaming machines 410*a*, 410*b* and two displays 412, 414. The displays 412, 414 are arranged to define a display area that is viewed by players at the gaming machines 410*a*, 410*b*. The first display 412 is positioned at or near the top of the gaming machines 410*a*, 410*b*, while the second display 414 is positioned at or near the center of the gaming machines 410*a*, 410*b*. A substrate 416 is interposed between the gaming machines 410*a*, 410*b* and is oriented at an angle. In some embodiments, one end of the substrate 416 is positioned near the lower left portion of the display 414 and the other end of the substrate 416 is positioned near the upper right portion of the display 412. It is contemplated that different configurations of the substrate 416 may be used with the present invention, such that at least two displays are on opposing sides of the substrate 416.

The display 412 faces in a downward direction, i.e., towards the top side of the angled substrate 416. The display 414 faces in an upward direction, i.e., towards the bottom side of the angled substrate 416. The displays 412, 414 may include an LCD, plasma screen or other displays typically used in gaming machines. In this orientation, the images from each display 412, 414 may be reflected by the respective sides of substrate 416.

Figure 4:
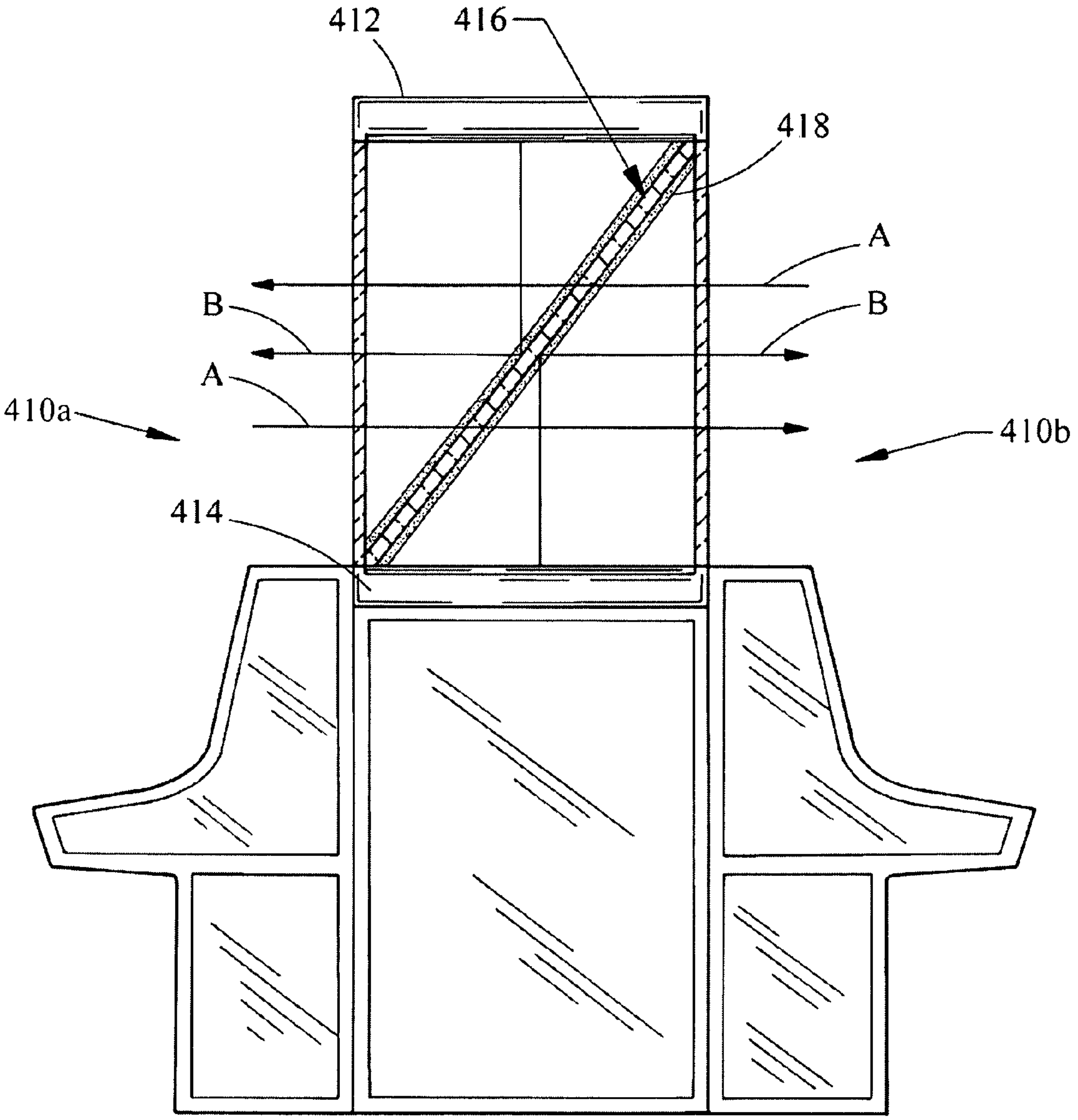
FIG. 4 is a side view of gaming machines for a two-player gaming system having a substrate interposed there between according to one embodiment of the present invention.

A layer 418 having variable opacity is positioned against the substrate 416. The layer 418, as shown in FIG. 4, is positioned against both sides of the substrate 416; however, it is contemplated that only a single layer 418 may be necessary and thus, only one layer 418 may be positioned against one side of the substrate 416. The layer may also be positioned between two substrates as in common in LCD construction. This layer 418 allows the controller 302 to alter the transmissive properties of the layer 418. The combination of the substrate 416 and the layer 418 may be referred to as the electro-optical assembly (see FIG. 3). Some examples of an electro-optical assembly may include an electrically-switchable glass device, such as a suspended particle device, a liquid crystal device or an electrochromic device.

An electrically-switchable glass device refers to glass that changes its light transmission properties when a voltage is applied. The electrically-switchable glass may change its opacity from an opaque, to a translucent (nearly transparent), to a transparent or clear state, or anything in between opaque and transparent.

For example, with suspended particle devices, particles are suspended in a fluid that is placed between two glass or plastic layers, or attached to one layer. When a voltage is applied, a thin film laminate of rod-like particles are aligned and allow light to pass through. When no voltage is applied, the suspended particles are arranged in random orientations and tend to absorb light so that the glass panel looks dark (i.e., opaque), such as a blue, grey or black color.

With liquid crystal devices, liquid crystal droplets are arranged in a sheet between two layers of glass. The liquid crystals scatter light such that when the device is "on," the liquid crystals align according to the electric field. When the device is "off," the liquid crystals are randomly oriented. Electrochromic devices can also change light transmission properties in response to voltage and thus allow the amount of light and heat passing through to be controlled.

The suspended particle devices, the liquid crystal devices and the electrochromic devices are marketed under the names of "smart glass," "switchable glass," "smart windows," "switchable windows," and "switchable privacy glass." Manufacturers of such devices include SwitchLite and SPD Control Systems Corporation.

In order to "switch" the glass, a parallel port may be used from the controller 302 to supply 5V DC to switch a solid state relay. An example of a solid state relay is a Magnecraft W6210DSC-1.

As shown in the particular embodiment of FIG. 4, the layer 418 having a variable opacity is positioned against the substrate 416. The controller 302 is electrically coupled to the layer 418 and is programmed to vary the opacity of the layer 418 from transparent to translucent to opaque or anything in between. When the layer 418 (and substrate 416) are transparent, players on opposite sides of the gaming machines 410*a*, 410*b* will be able to view each other through the substrate 416, as illustrated by arrows A. When the layer 418 is opaque, players at the gaming machines 410*a*, 410*b* will not be able to view each other and will only see images reflected from the respective displays 412, 414, as illustrated by arrows B. When the layer 418 is translucent, players at the gaming machines 410*a*, 410*b* will be able to view each other through the substrate 416 (albeit not as clearly as if the layer 418 were transparent), as illustrated by arrows A, and will also be able to view video images reflected from the displays 412, 414, as illustrated by arrows B.

Figure 5B:
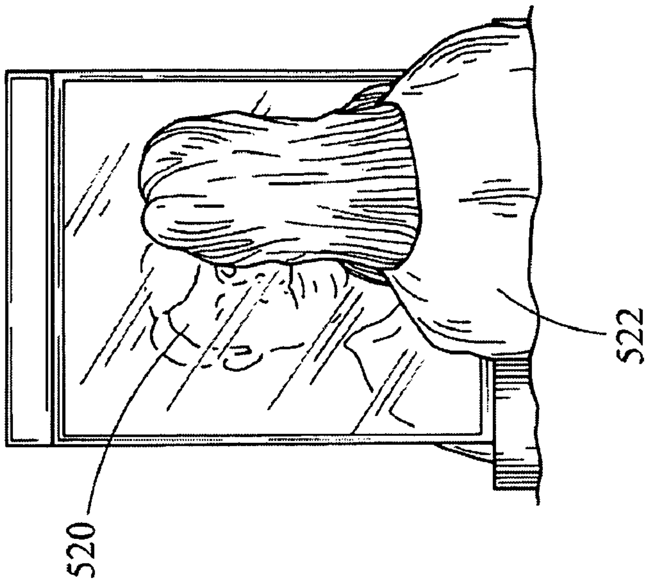
FIG. 5*b* is a perspective view of the display area of FIG. 5*a* wherein a player views the other player through the substrate.
Figure 5A:
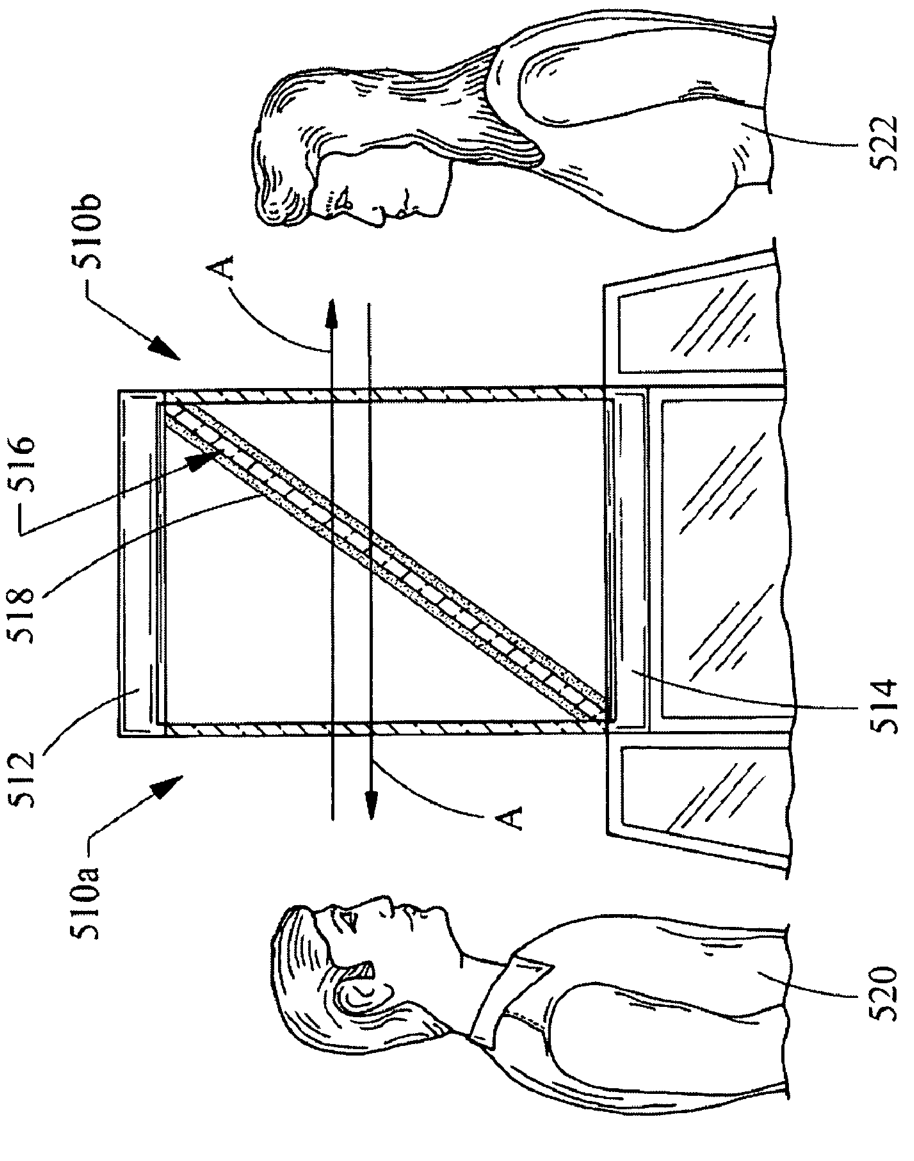
FIG. 5*a* is a side view of the display area of a two-player gaming system showing the line of vision when the substrate is transparent.

These concepts are represented pictorially in FIGS. 5-7. For example, in FIG. 5*a*, when the layer 518 is transparent, players 520, 522 playing at gaming machines 510*a*, 510*b*, respectively, are able to view each other through the substrate 516, as shown in FIG. 5*b*. In this scenario, the players 520, 522 see only the view through the substrate 516, i.e., the other player sitting at the gaming machine on the opposite side, and do not see any video images superimposed relative to the substrate 516 from the displays 512, 514. Arrows A indicate that the players 520, 522 are able to see through the substrate 516.

Figure 6A:
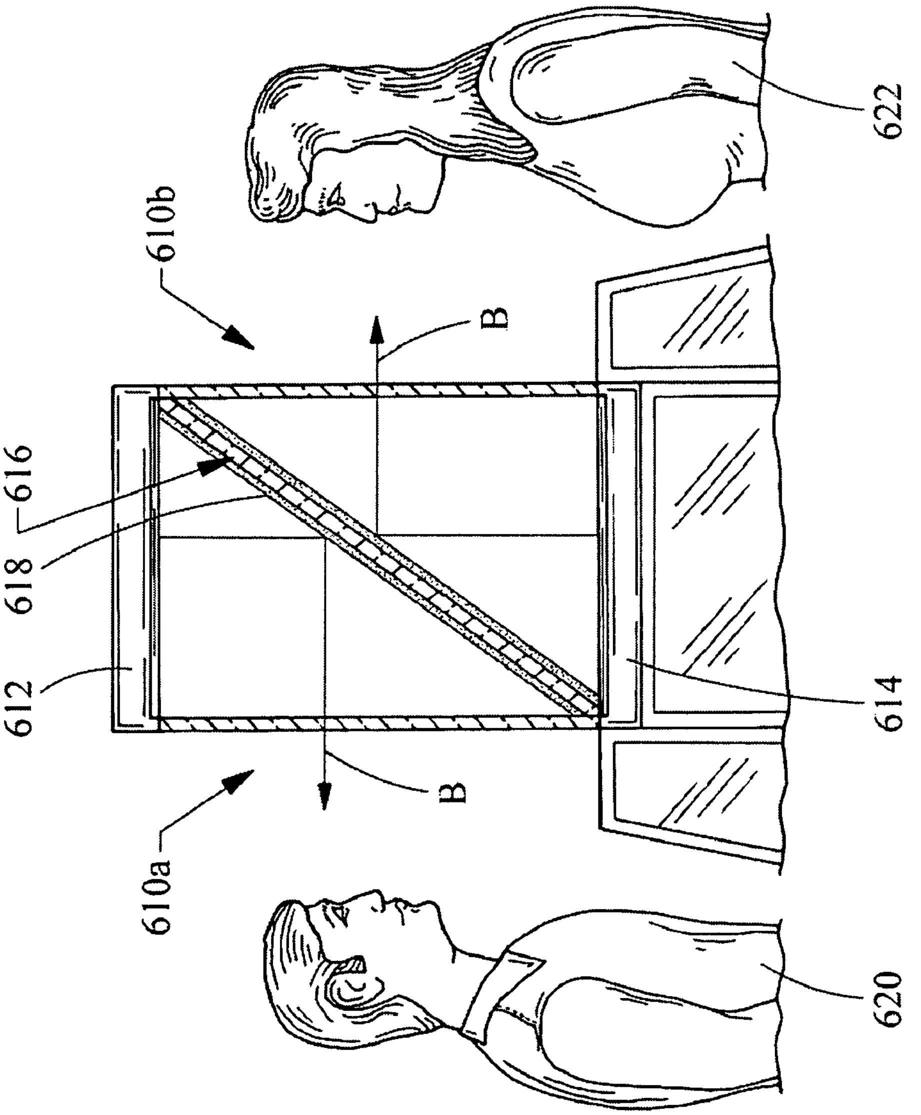
FIG. 6*a* is a side view of the display area of the two-player gaming system wherein the substrate is opaque.
Figure 6B:
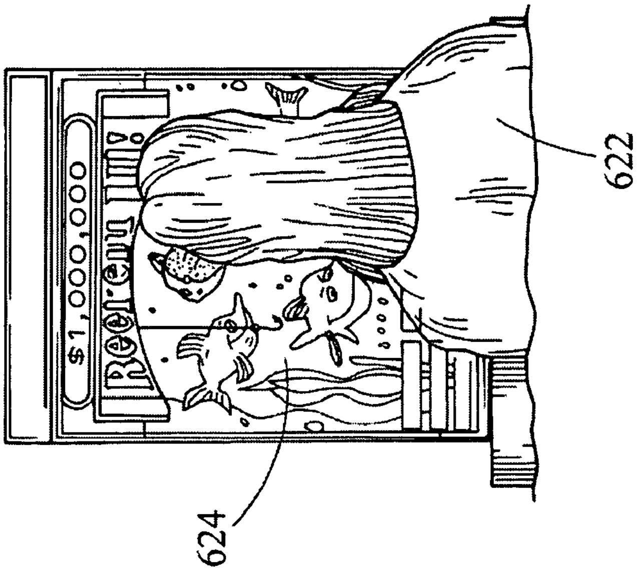
FIG. 6*b* is a perspective view of the display area of FIG. 6*a* wherein a player views video images relative to the substrate.

In FIG. 6*a*, as the layer 618 is altered to become opaque, players 620, 622 playing at gaming machines 610*a*, 610*b*, respectively, are unable to view each other through the substrate 616, as shown in FIG. 6*b*. In this scenario, the players 620, 622 see only the video images 624 superimposed relative to the substrate 616 from the displays 612, 614 and do not see the other player sitting at the gaming machine on the opposite side. This embodiment is similar to traditional gaming machines where the players only view the images on their respective displays. Arrows B indicate that the players 620, 622 see only the superimposed video images 624.

Figure 7B:
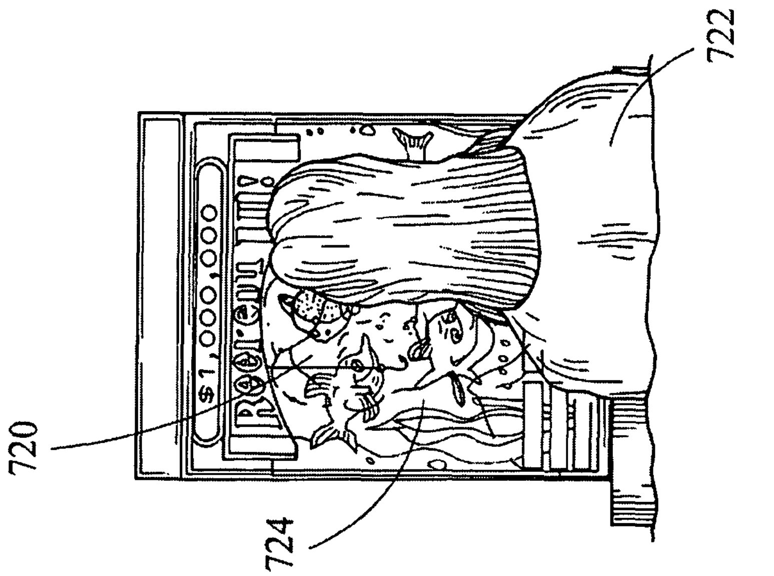
FIG. 7*b* is a perspective view of the display area of FIG. 6*a* wherein a player views the other player and images relative to the substrate.
Figure 7A:
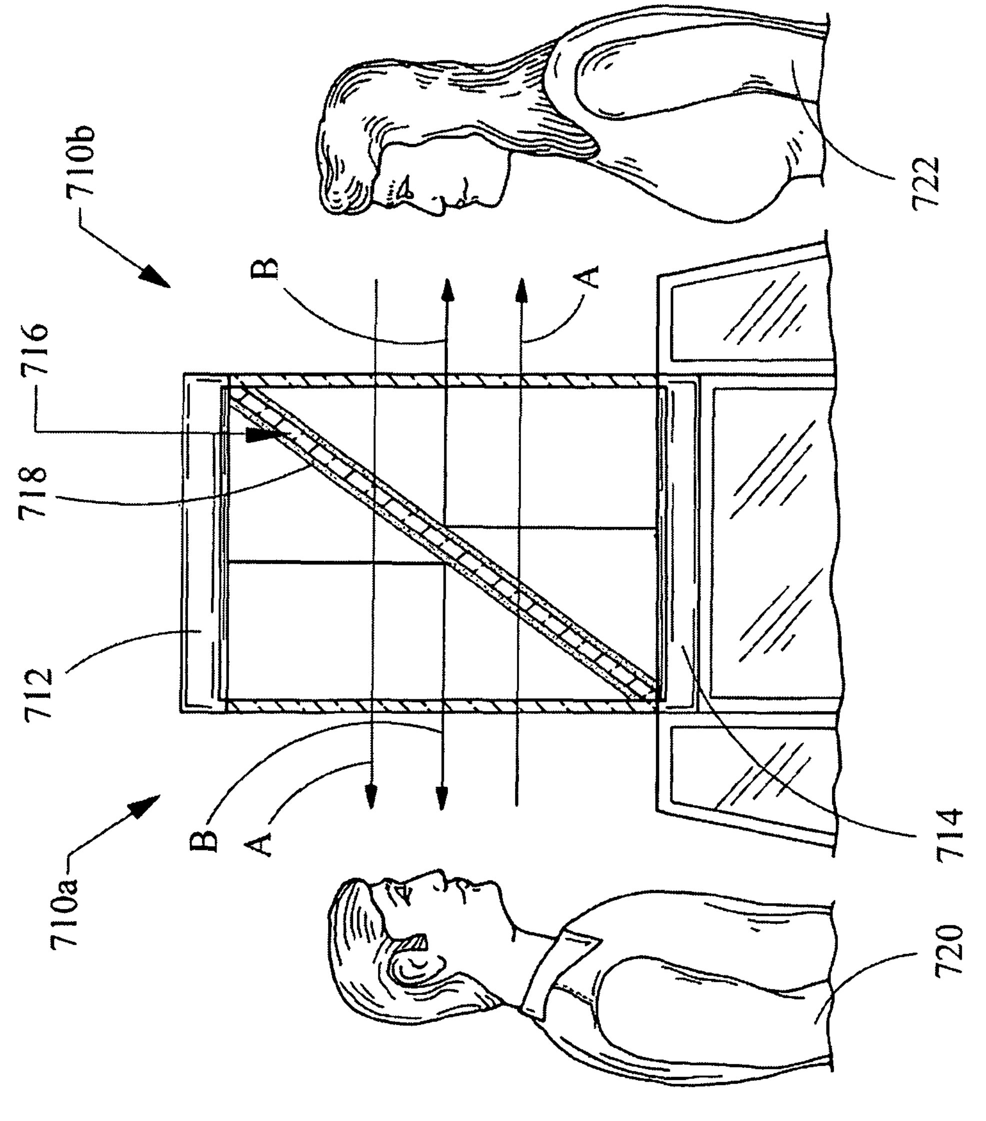
FIG. 7*a* is a side view of the display area of the two-player gaming system showing the line of vision when the substrate is translucent.

In FIG. 7*a*, as the layer 718 is altered to become translucent, players 720, 722 playing at gaming machine 710*a*, 710*b*, respectively, are able to view each other through the substrate 716 as well as view the superimposed images 724 from the displays 712, 714 relative to the substrate 716, as shown in FIG. 7*b*. The players 720, 722 see the view through the substrate 716, i.e., the other player sitting at the gaming machine on the opposite side, and the video images 724 superimposed relative to the substrate 716 from the displays 712, 714. Thus, arrows A indicate that the players 720, 722 see through the substrate 716 and arrows B indicate that the players see the superimposed video images 724.

Figure 8A:
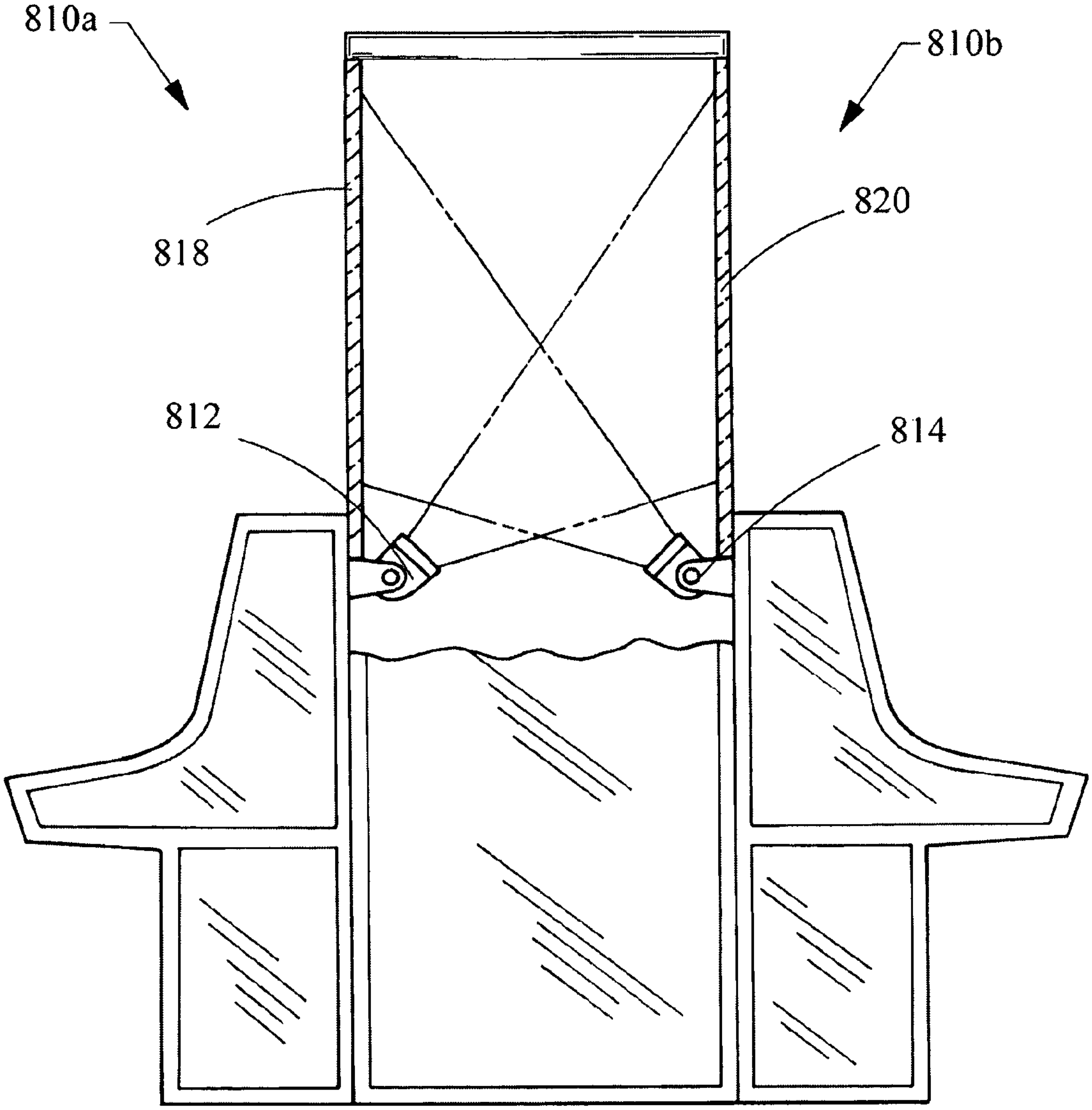
FIG. 8*a* is a side view of the gaming machines for a two-player system according to another embodiment of the present invention.

In further embodiments, other two-player gaming systems may employ different methods of displaying the video images. In FIG. 8*a*, at least two projector units 812, 814 are positioned between the gaming machines 810*a*, 810*b* to project the video images relative to the substrates 818, 820. The substrates 818, 820 may include transparent material having variable opacity, such as liquid crystal, suspended particle, or electrochromic material.

As the substrates 818, 820 become more opaque (preferably a white opaque color), the system operates similar to a rear-projection display. As the opacity of the substrates 818, 820 varies, the substrates 818, 820 may become clear to allow the players to view each other through the substrates 818, 820. As the substrates 818, 820 become translucent, video images may be superimposed over the view through the substrates 818, 820 so that the players see both the video images and the other player.

Figure 8B:
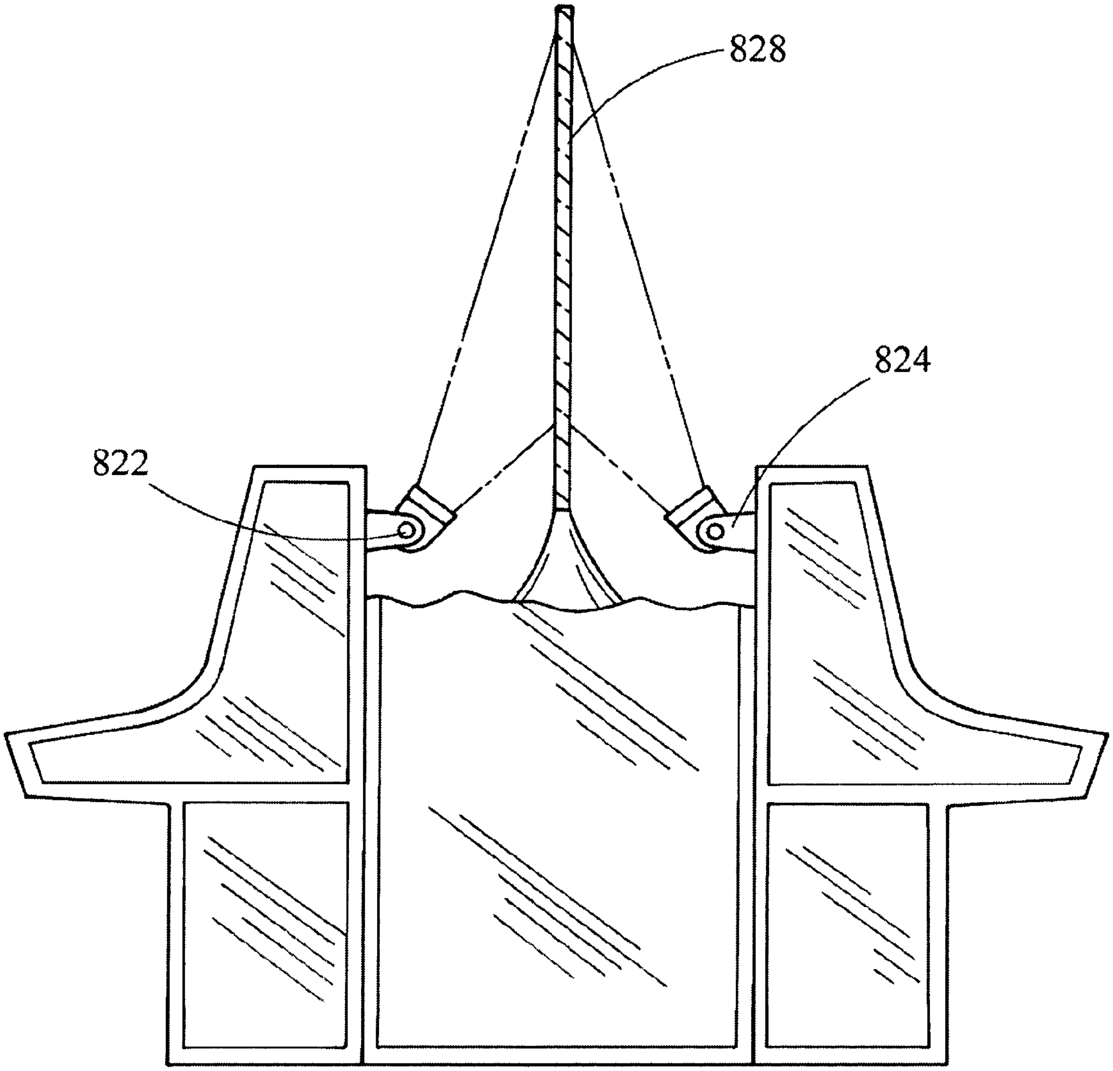
FIG. 8*b* is a side view of the gaming machines for a two-player system according to a further embodiment of the present invention.

In FIG. 8*b*, a similar gaming system is shown whereby at least two projector units 822, 824 project video images relative to a single substrate 828 having variable opacity. As the substrate 828 becomes more opaque (preferably a white opaque color), the system operates similar to a front-projection display. As the opacity of the substrate 828 varies, the substrate 828 may become clear to allow the players to view each other through the substrate 828. As the substrate 828 becomes translucent, video images may be superimposed over the view through the substrate 828 so that the players see both the video images and the other player. In this embodiment, the video images that are superimposed on one side of the substrate 828 may appear as mirror-images on the other side of the substrate 828. This imparts an element of reality to video images of the wagering game. Alternately, both surfaces of the substrate 828 may be positioned against a layer, such as layer 418, having variable opacity, each such layer being individually controlled to vary the opacity such that one or both surfaces of the substrate 828 may appear transparent or translucent or opaque to either player.

Figure 9:
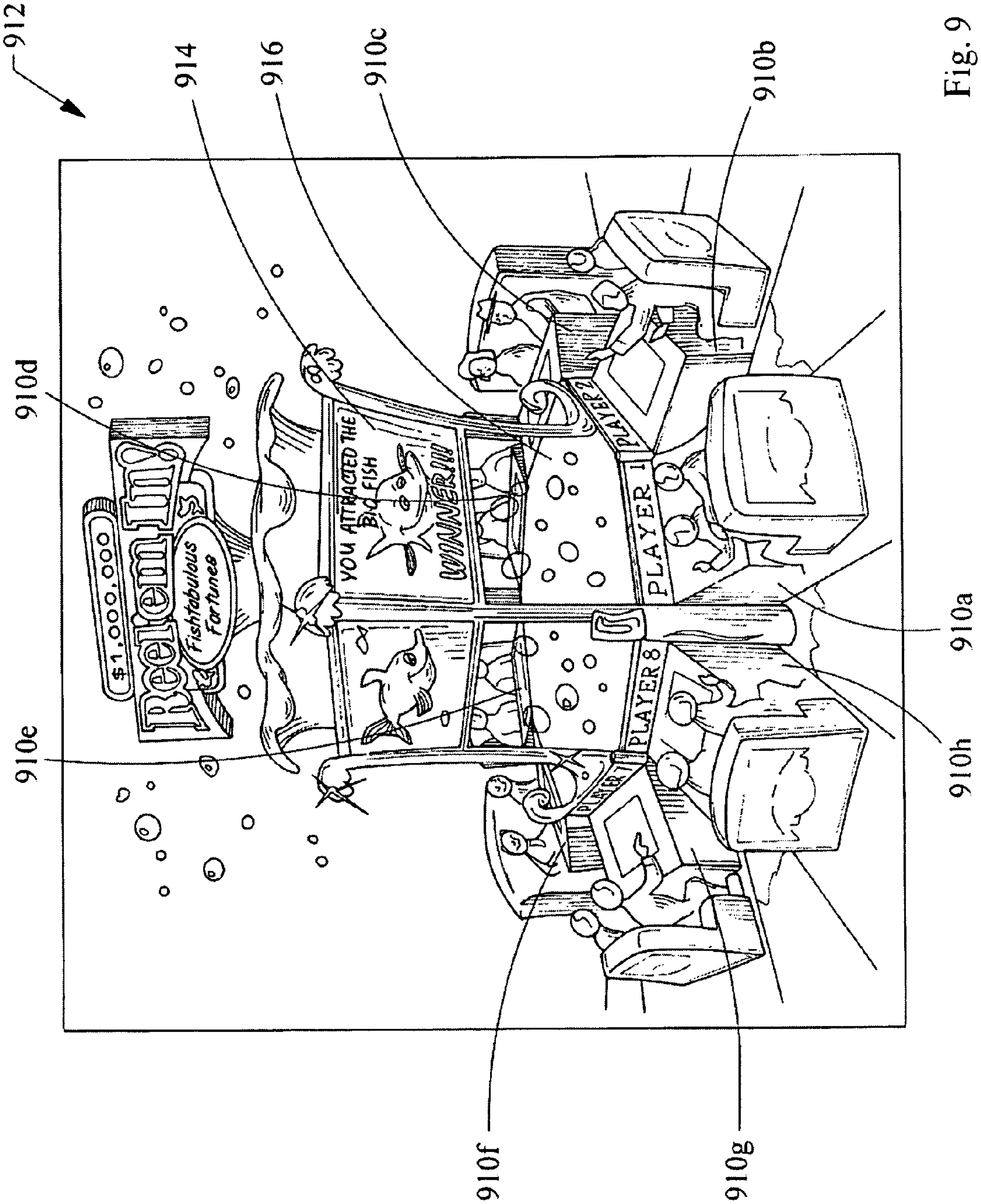
FIG. 9 is a perspective view of a multi-player gaming system.

FIG. 9 illustrates another embodiment including a multi-player gaming system. This particular implementation shows a gaming system having eight gaming machines 910*a-h* situated around signage 912 that includes a four-sided display. The particular wagering game shown in FIG. 9 is described as having a "REEL'EM IN®" fishing theme; however, nearly any type of wagering game may be used with the embodiments described herein. Some portions of the signage 912 may include traditional displays 914 for displaying video images and may show images related to a specific wagering game. Other portions of the signage 912 may include substrates 916 having layers with variable opacity which allow the players at the gaming machines 910*a-h* to view other players and video images superimposed relative to the substrates 916. In the particular embodiment shown in FIG. 9, the variable-opacity substrates 916 are located below the traditional displays. However, it is contemplated that the substrates 916 may be located in other areas of the signage 912 to allow players to see different views from around the gaming machines 910*a-h*.

Figure 10:
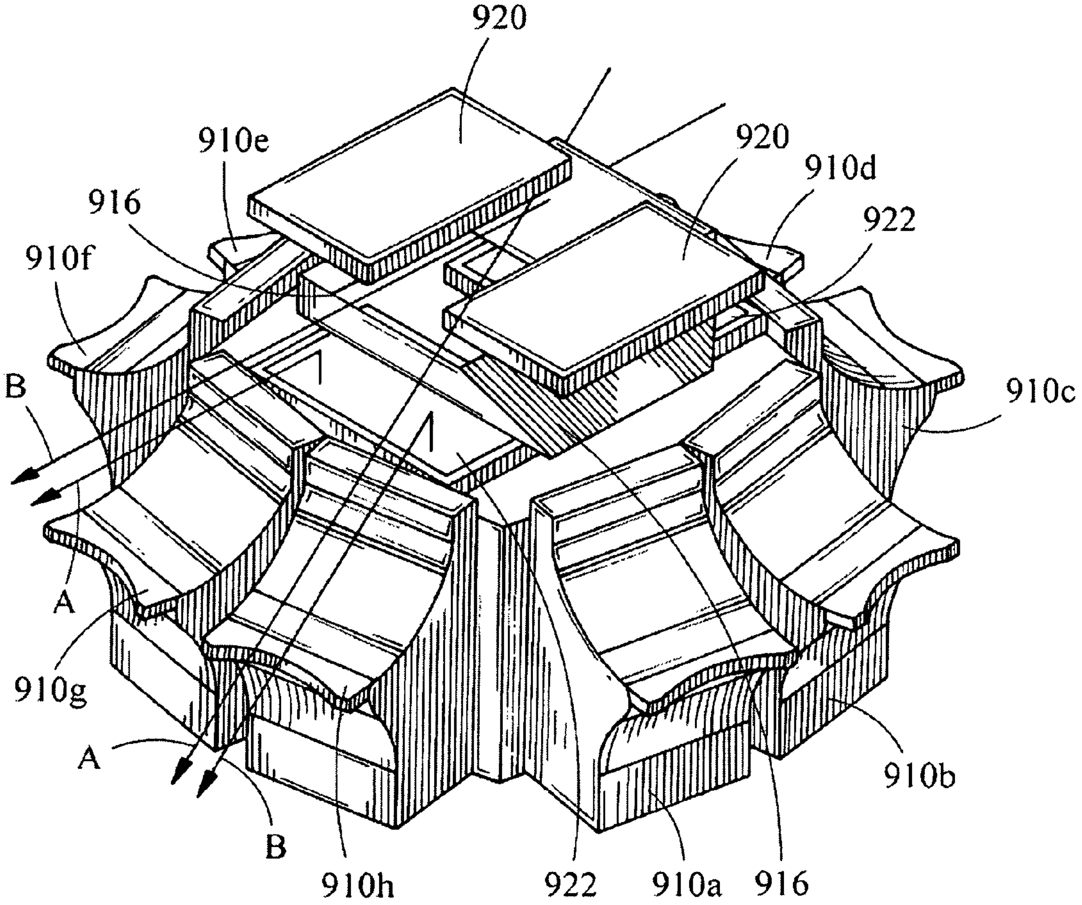
FIG. 10 is a perspective view of the display area of the multi-player gaming system.

FIG. 10 shows the multi-player gaming system of FIG. 9 having upper displays 920 and lower displays 922 for superimposing the video images relative to the substrates 916. In this embodiment, one substrate 916 is shown for every two gaming machines. Similar to the two-player gaming systems, layers having variable opacity may be positioned against the substrates 916 such that players are able to view other players at the gaming machines 910*a-h* when the layers are transparent. When the opacity of the layers is changed and the layer becomes translucent, the players are able to view both the other players at gaming machines 910*a-h* as well as the video images that are superimposed relative to the substrates 916. For a traditional gaming system, the layers may be more opaque such that only the video images may be reflected relative to the substrates 916, i.e., the players cannot see through the substrates 916 to the players on the other sides.

In some embodiments, not all of the video images are reflected to a player. Such an occurrence can be corrected by adjusting the overall size of the multi-player gaming system, the LCDs, and positioning of the substrates 916. As shown in FIG. 10, the displays 920, 922 are flat, however it may be advantageous to vary the angle of the displays 920, 922 and the angle of the substrates 916. For example, the angles of the displays 920, 922 and the substrates 916 can be adjusted where the gaming machines are upright games, instead of "slant-top" games as shown in FIGS. 9 and 10, to change the players' viewing angles.

Figure 11B:
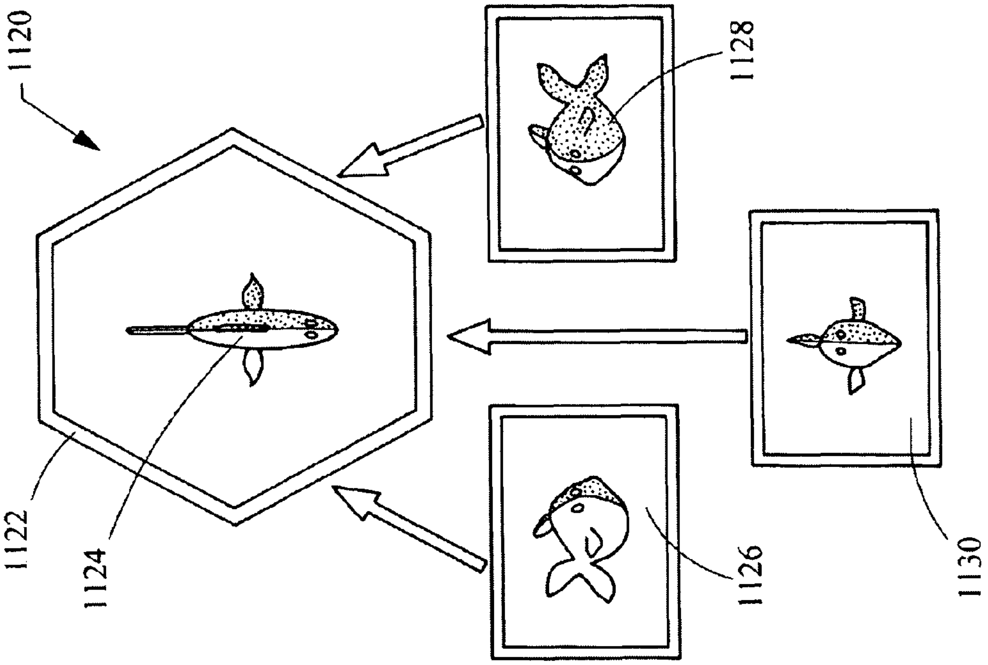
FIGS. 11*a* and 11*b* are perspective views of video images as viewed by a 4-player and 6-player gaming system configurations.
Figure 11A:
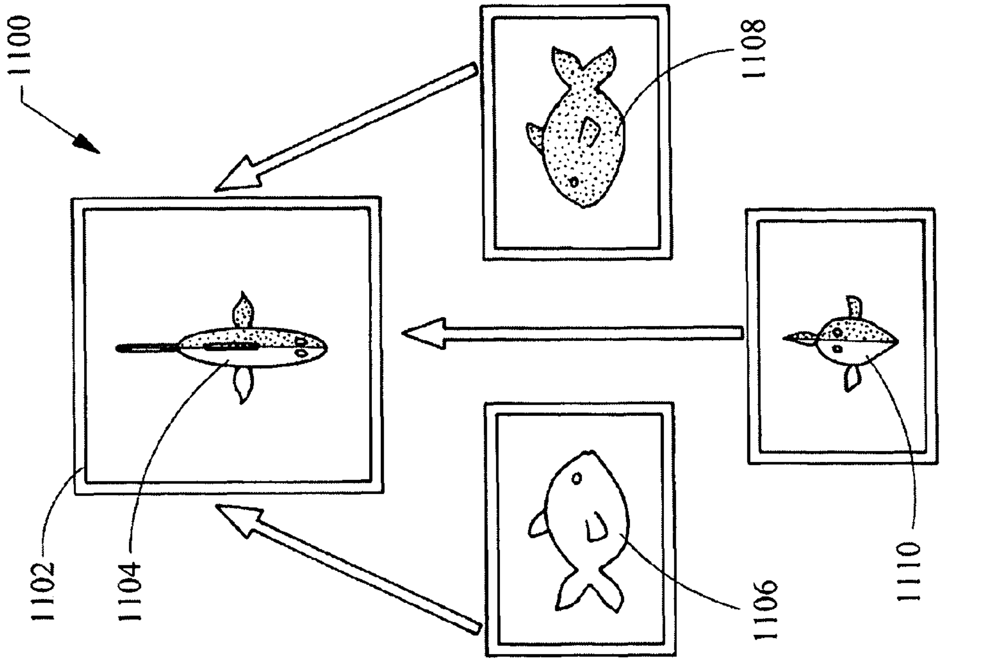

In addition to the eight-player gaming system described above, it is contemplated that gaming systems having different numbers of players may be used with the present invention. For example, FIG. 11*a* and FIG. 11*b* illustrate different views for four- and six-sided embodiments, respectively. The four-sided view 1100 illustrates a substrate 1102 relative to a video image 1104 as shown from three different views 1106, 1108, 1110. The first view 1106 illustrates what a player viewing from the left side of the substrate 1102 will see, i.e., the "left" side of the fish. The second view 1108 illustrates what a player viewing from the right side of the substrate 1102 will see, i.e., the "right" side of the fish (which has been shaded for ease of discussion). The third view 1110 illustrates what a player viewing from the front of the substrate 1102 will see, i.e., the "front" of the fish.

Similarly, the six-sided view 1120 illustrates a substrate 1122 relative to a video image 1124 as shown from three different views 1126, 1128, 1130. The first view 1126 illustrates what a player viewing from the nearest left side of the substrate 1122 will see, i.e., the "left" side of the fish and a portion of the "right" side of the fish. The second view 1128 illustrates what a player viewing from the nearest right side of the substrate 1122 will see, i.e., the "right" side of the fish and a portion of the "left" side of the fish. The third view 1130 illustrates what a player viewing from the front of the substrate 122 will see, i.e., the "front" of the fish. Compared to the four-sided view, some views from the six-sided views include different portions of the fish due to the different viewing angles. Besides the two-player, four-player, six-player and eight-player configurations described herein, it is contemplated that other configurations may also be used with the present invention.

Figure 12A:
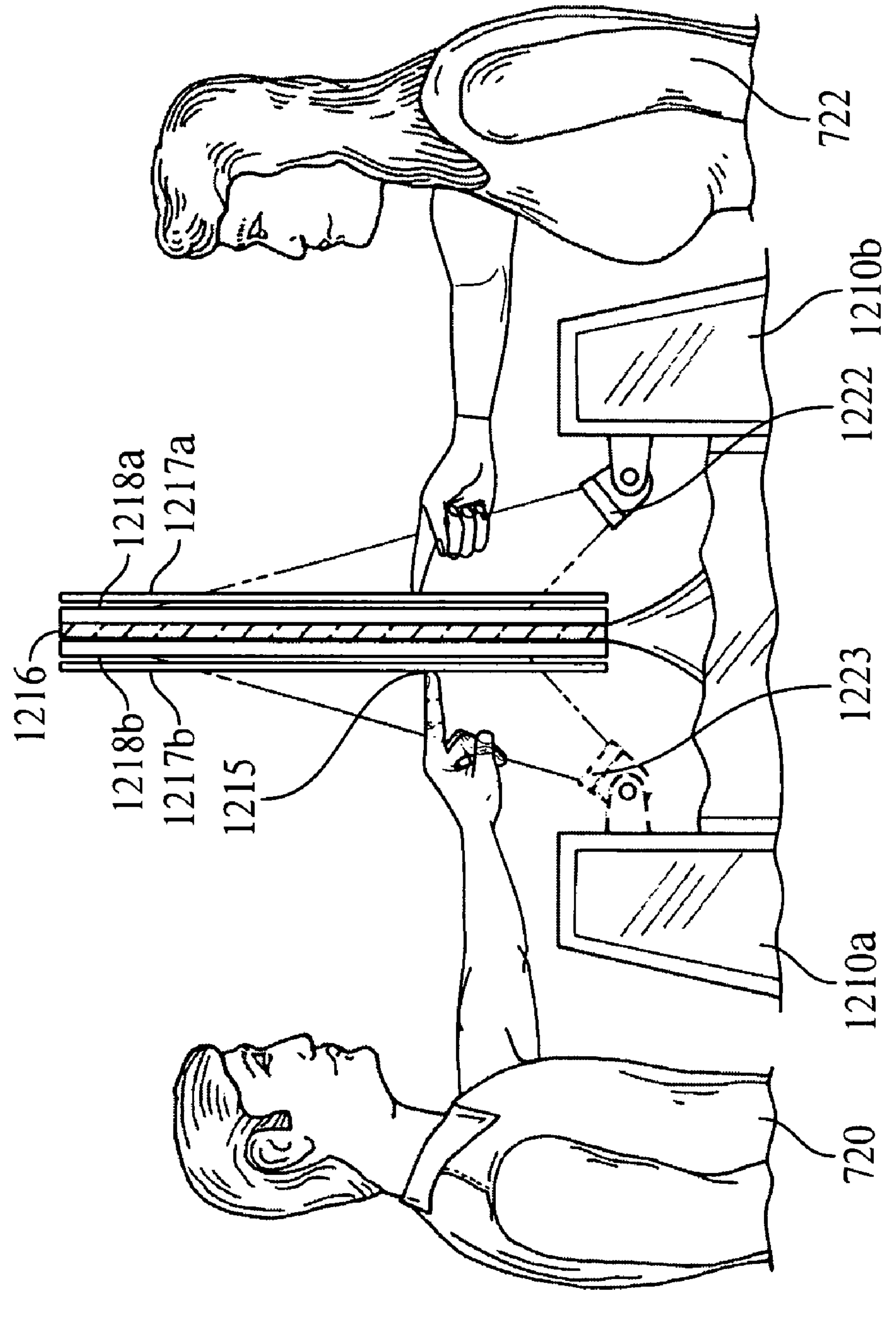
FIG. 12*a* is a side view of a two-player gaming system according to yet another embodiment of the present invention.

FIG. 12A illustrates a further embodiment of a two-player gaming system. In this embodiment, the two-player gaming system includes gaming machines 1210*a*, 1210*b* and a single substrate 1216. The substrate 1216 is interposed between the gaming machines 1210*a*, 1210*b*. Layers 1218*a*, 1218*b* having variable opacity are positioned against opposite sides of the substrate 1216. The layer 1218, as shown in FIG. 12A, is positioned against both sides of the substrate 1216; however, it is contemplated that only a single layer 1218 may be necessary and thus, only one layer 1218 may be positioned against one side of the substrate 1216. The layer may also be positioned between two substrates as in common in LCD construction. Such configurations allow the controller 302 to alter the opacity or transmissive properties of the layer 1218. The combination of the substrate 1216 and the layers 1218*a,b* is referred to as the electro-optical assembly (see FIG. 3). It should be noted that the gaming machines 1210*a*, 1210*b* may be part of a single gaming machine and housed within a single or multiple cabinets. This implementation is not intended to be limited to any particular number of gaming machines or any particular configuration, as long as multiple players have their own station or machine complete with those input device (s), display(s), output device(s), etc. that are desired for each player 720, 722 to interact with the wagering game.

FIG. 12A shows at least one projector unit 1222 for projecting video images onto the single substrate 1216 and relative to the layer(s) 1218*a*, 1218*b*. In some embodiments, an optional second projector 1223 may also be disposed on an opposite side from the projector unit 1222 for projecting video images relative to that side of the single substrate 1216. For example, if one or both of the layer(s) 1218*a*, 1218*b* is rendered opaque, video images may be projected relative to the layer(s) 1218*a*, 1218*b* and those video images are visible on both sides of the electro-optical assembly 1216, 1218. The video images may be superimposed on the substrate 1216, such that players at gaming machines 1210*a* and 1210*b* are able to see the same video image (although the video image superimposed on one side of the substrate 1216 may be a mirror image of the video image superimposed on the opposite side of the substrate 1216). In some embodiments, the players are able to view the other player interacting with the same video image, which is related to the wagering game being played. In this embodiment, each of the players at gaming machines 1210*a* and 1210*b* may interact with the same video image by, for example, touching the video image 1215 via respective touch screens 1217*a*, 1217*b* positioned adjacent the layers. This allows players to interact with the same object within the same gaming space. Players are thus able to play collaboratively with the player on the other side of the substrate 1216.

The ability for players positioned on opposite sides of a gaming system disclosed herein to not only view each other and observe the other's facial expressions, hand gestures, and the like but also to view the video images related to the wagering game and view each other's selections represents a surprising and unpredictable improvement over existing gaming systems. The resulting experience is more fun and entertaining, and can attract novice or marginally disinterested players to place wagers. The amount of coin-in per square foot can be increased because the amount of space required compared to two side-by-side gaming machines is reduced. The spacing between the two players needs to be relatively short to allow both players to see each other at a comfortable distance. Players sitting next to one another at existing gaming machines must turn their heads away from the display in order to view or talk with an adjacent player. Onlookers or companions have to stand behind players sitting at existing gaming machines in order to learn or observe game play. In the gaming systems disclosed herein, the players are already face-to-face and need not remove their eyes from the display in order to communicate or observe each others gestures or expressions. Companions or onlookers can watch the game play from the opposite side of the gaming system and can learn and benefit from observing a more experienced player's selections. Moreover, certain portions of the electro-optical display may be rendered opaque to obscure video images seen by one player. This effect can be exploited with surprising results during a wagering game. For example, certain images may be seen by one of the players and obscured to the other play only to be revealed later by altering the opacity of the display from opaque to transparent.

Such collaborative game play enhances the community gaming experience. For example, interacting with the same video image may cause certain game mechanics to come into play that were not available when the player was playing alone. This may include team wagers, secondary wagers and game play that are only enabled by playing with another player. Additionally, being able to view the actions and expressions of the player on the opposite side of the substrate 1216 allows both players to obtain a sense of how the other player is playing and his or her strategies for playing the wagering game. As the players are able to view each other through the substrate 1216 (see FIG. 12B) when the layer(s) 1218*a*, 1218*b* are rendered transparent, they may actually have a dialogue to discuss their strategies. Thus, in addition to seeing the actual inputs that a player is making (and making similar selections), the players may exchange ideas or simply read each other's expressions and movements to understand what another player is contemplating regarding the same wagering game. This may assist more inexperienced players as they are able to benefit from another player's skill or experience. Moreover, players may feel more confident about making certain selections based on similar selections being made by other players.

Figure 12B:
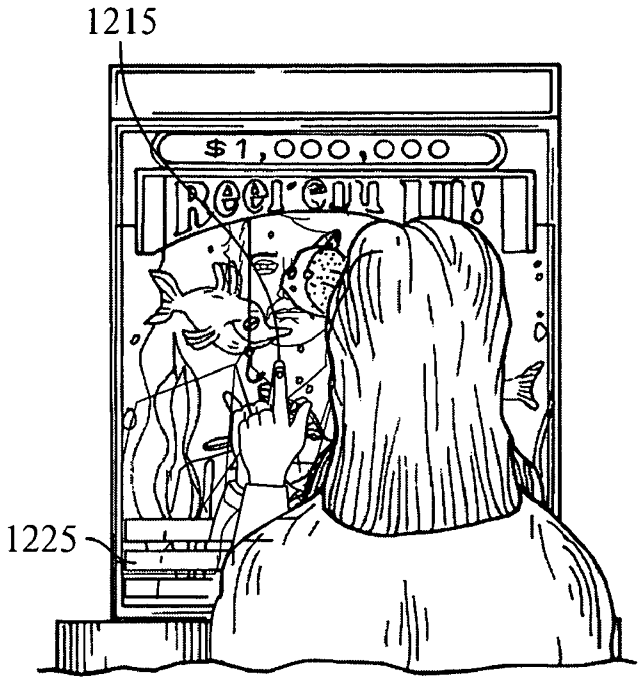
FIGS. 12*b* and 12*c* are front views of a display of the gaming system shown in FIG. 12*a* from the perspective of each of the two players according to an aspect of the present invention.
Figure 12C:
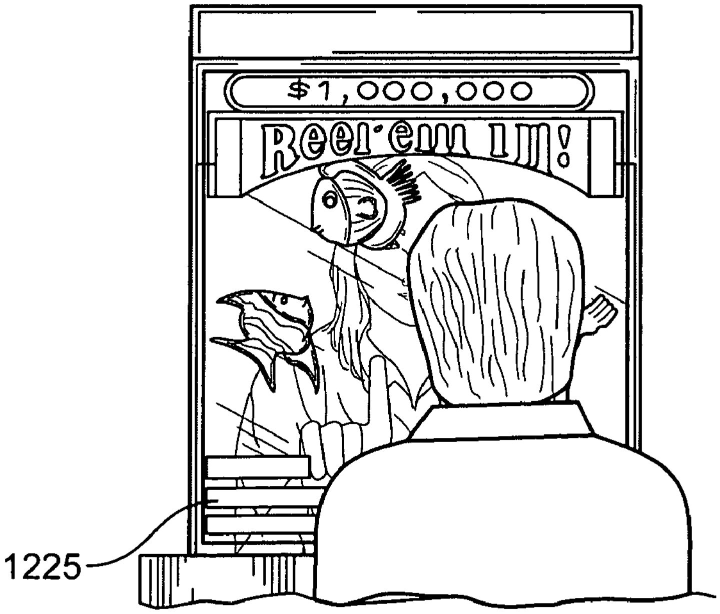

As shown in FIG. 12B, the players are able to view each other through the substrate 1216 and make a selection of the same video image 1215. The layer(s) 1218*a*, 1218*b* are rendered transparent in this implementation to permit the players to see one another through the substrate 1216. A shared wager area 1225 allows the players to make wagers relating to the community wagering game, including team wagers, secondary wagers and wagers that can only be made when two or more players are playing the community wagering game. As shown in FIG. 12C, at various times, a player may simply view the selections of the other player without making a selection in order to benefit from the strategy, skill or experience of the other player. Novice or less experienced players may thus be trained by more experienced players and benefit from the expertise of the more experienced players. This shared gaming experience can attract novice players unsure of their abilities or intimidated by certain wagering games to play them, because they have someone (either a companion or even a stranger) to guide them through a wagering game while they interact with it. The novice players "learn by doing," and thus their experience level increases rapidly so that they quickly learn to play a wagering game and gain the confidence to continue to play.

In some embodiments, by varying the opacity of the layers 1218*a,b*, all or certain portions of the substrate 1216 may be "grayed out" such that a player will only be able to see certain relevant portions, i.e., those portions related to a shared wager input. In other embodiments, certain portions of the substrate 1216 may be "grayed out" to indicate a losing (e.g., the player did not achieve an award or winning outcome during the wagering game) or inactive side (e.g., no player has inputted a wager). To gray out an area, the controller 302 causes the opacity of all or a portion of one or both of the layers 1218*a,b* to be opaque, preventing light from passing through that opaque area. This graying out also permits different video images to be displayed on opposite sides of the layers 1218*a, b*, such as alphanumeric characters that have to be displayed on a regular or non-reversed order so as to be legible to the players.

As described above, by varying the transmissive properties of the layers 1218*a,b* the substrate 1216 may be made to appear to be transparent (which allows the players to see through the substrate 1216), translucent (which allows the player to see the player and certain video images projected onto the substrate 1216) and/or opaque (which allows the player to see only the video images projected onto the substrate 1216).

A shown in FIG. 12A, the electro-optical assembly 1216, 1218 positioned between gaming machines 1210*a* and 1210*b* allows the players to be positioned closer together, thus improving the sense of "sharing" in the gaming experience and reducing the floor space required for the bank. In some embodiments, the electro-optical assembly 1216, 1218 may include a three-dimensional holographic projection screen. Such a suitable commercially available screen is available from Laser Magic Productions based in Sherman Oaks, Calif. (www.laser-magic.com), designated as TRANSCREEN™. These screens are made of a polyester film with coatings to capture the video images and have a thickness of about 4 mil. By using these types of screens, the video images may appear to be hovering in space. Such screens may operate with multiple projectors, such as projectors 1222, 1223, or may operate with a single projector 1222.

Figure 13:
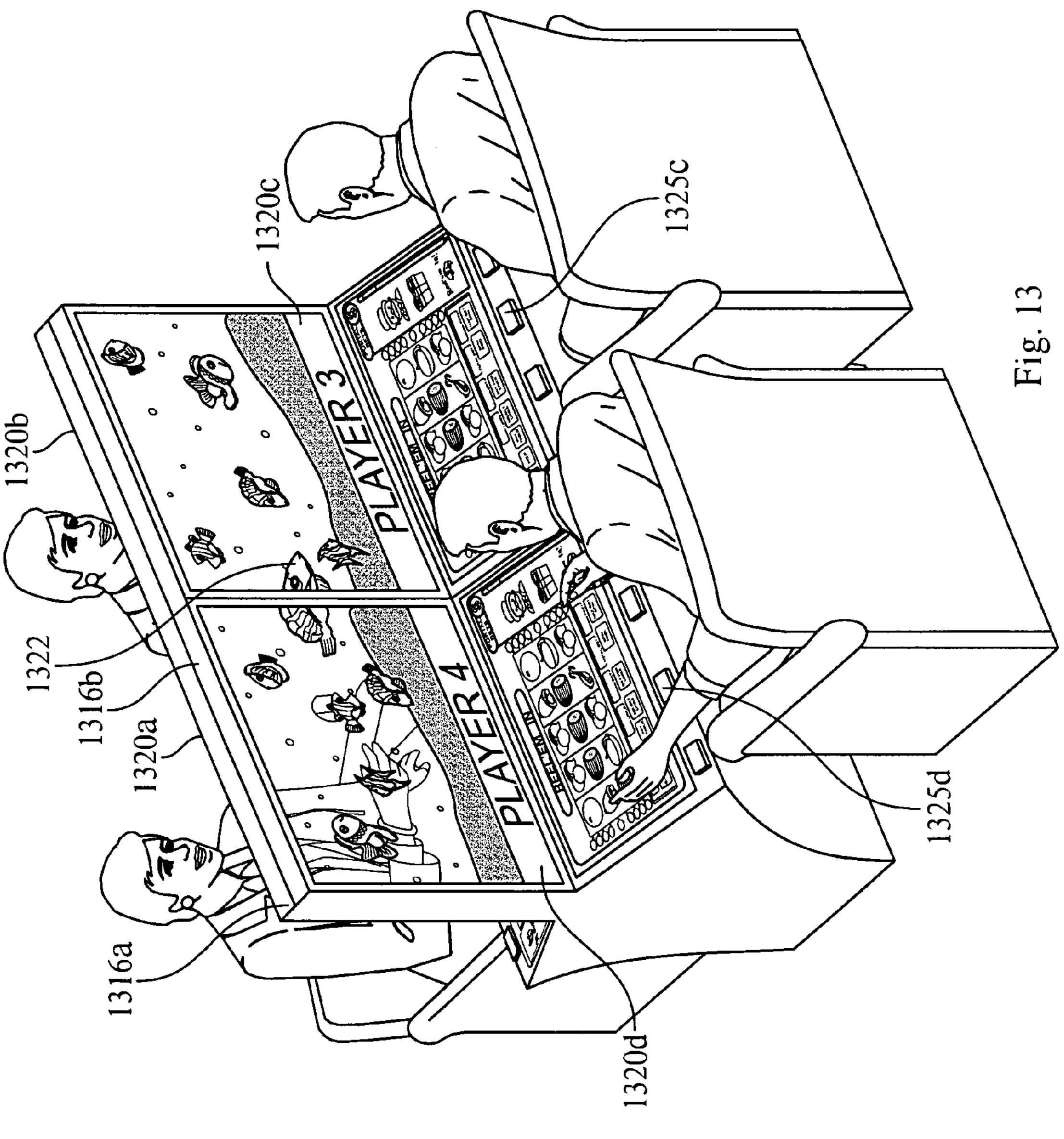
FIG. 13 is a perspective view of a multi-player gaming system in which the display is divided into zones whose transparency can be separately controlled according to yet another embodiment of the present invention.
Figure 14A:
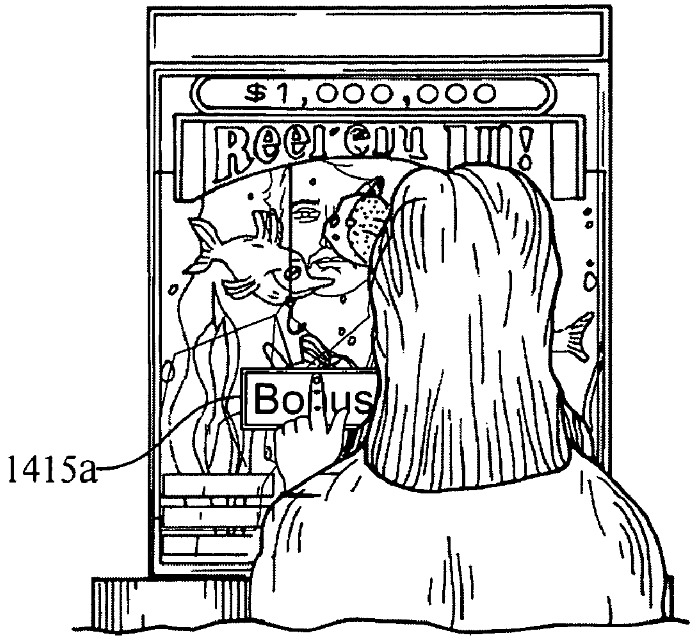
FIGS. 14*a* and 14*b* are front views of a display of a gaming system from the perspective of each of two players in which both players can touch the same object from opposite sides of the display according to still another embodiment of the present invention.
Figure 14B:
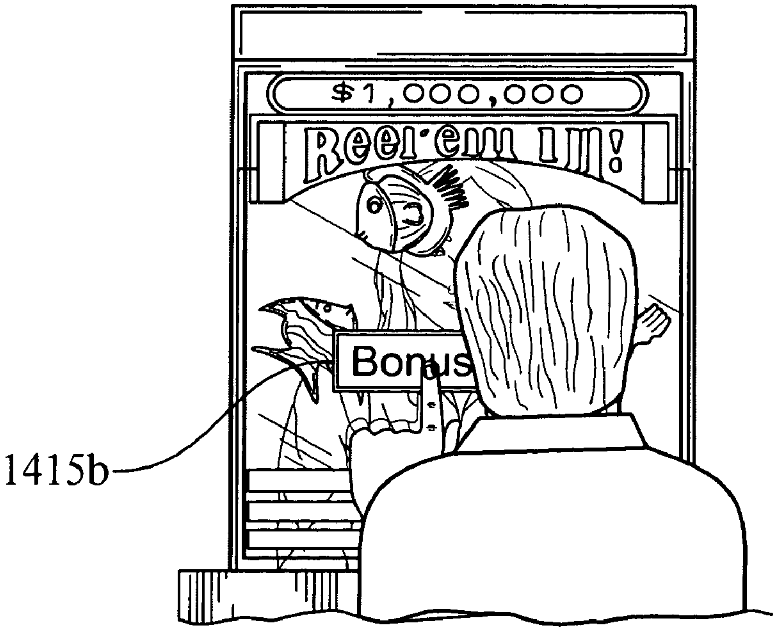

In yet other embodiments, multiple-player gaming systems allow two or more players to play at gaming machines having one or more electro-optical assemblies that may be divided into defined zones, as illustrated in FIG. 13. In some examples, the electro-optical assemblies may include LCD screens. The zones may be associated with a particular player position, i.e., player 3 or player 4. In this implementation, four players are playing at a two-sided gaming system, with two players sitting on either side of substrate portions 1316*a,b*. Each of the substrate portions 1316*a,b* may include two separately-controllable zones 1320*a,b* and 1320*c,d*, respectively. Each zone 1320*a-d* includes a layer for individually varying the opacity in each zone. The layer can span across multiple zones. The substrate 1316 may be a single or multiple substrates. One or more touch screens may also be positioned against the layer(s) for receiving player inputs. As in the embodiments described herein, the opacity of the layers in each of the zones 1320*a-d* may be varied such that certain portions of the layers may be opaque such that one player may not be able to view the player on the opposite side of the substrate 1316. For example, as shown in FIG. 13, the opacity of the layer associated with Player 4 is such that a player sitting at the PLAYER 4 position is able to view the player sitting on the opposite side as well as video images displayed relative to the electro-optical assembly. In contrast, the opacity of the layer associated with the PLAYER 3 position is such that the player sitting at the PLAYER 3 position is not able to view the player sitting on the opposite side, but only views video images displayed relative to the electro-optical assembly. In addition to having a touch screen associated with each zone 1320*a-d*, player input devices 1325*a-d* may also allow a player to make certain selections or game inputs.

In the multi-player gaming system of FIG. 13, some of the video images may be displayed across the two zones, i.e., zone 1320*c* and zone 1320*d*, to create a shared video image 1322. The players at positions PLAYER 3 and PLAYER 4 can interact with the shared video image 1322. This further adds to the community gaming experience as both players can interact with the same video image.

Figure 15:
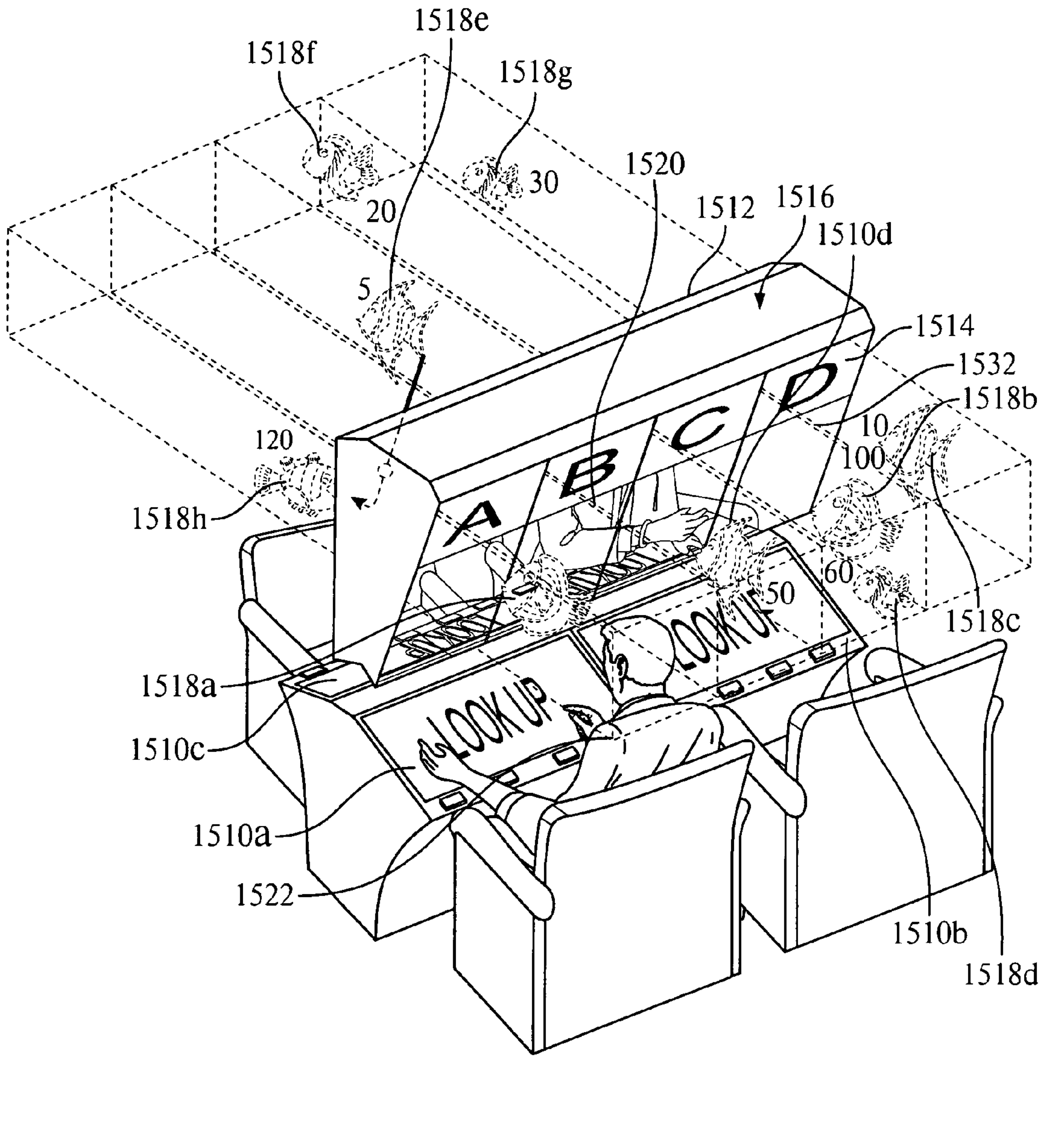
FIG. 15 is a perspective view of a multi-player gaming system in which players view three-dimensional objects and interact via a transparent portion of a display to affect the outcome of the wagering game according to yet another embodiment.

In another multi-player wagering game implementation shown in FIG. 15, a multi-player gaming system includes gaming machines 1510*a-d*, having two oppositely faced LCD displays 1512, 1514 and at least one variable opacity layer 1516 adjacent to the LCD displays 1512, 1514. The LCD displays 1512, 1514 may be transparent in this implementation. In this particular implementation, a virtual aquarium/ocean is presented on the LCD displays 1512, 1514 having various wagering-game objects 1518*a-h*, i.e., fish, associated with certain outcomes, i.e., credit awards. In this gaming scenario, a bonus game is triggered and each player 1520, 1522 may participate in the bonus game with their winnings and may be awarded a credit amount and a "hook" multiplier.

One of the players 1520, 1522 may be designated to control the location of a virtual hook 1530 as it is trolling through the underwater three-dimensional aquarium/ocean. The hook 1530 is actually displayed on one of the LCD displays 1512, 1514, but is shown in FIG. 15 as if appearing to hover for ease of illustration. In fact, the players 1520, 1522 see the virtual hook 1530 on the LCD displays 1512, 1514, respectively. In this example, the player 1522 controls the location of the hook 1530. The player 1522 may move the hook 1530, via buttons located on the gaming machines 1510*a-d* or touch screens associated with the displays 1512, 1514, to locations associated with different areas of the LCD displays 1512, 1514, shown as areas "A," "B," "C" and "D," in FIG. 15. These areas may be associated with one or more of the objects 18*a-h*. For example, objects 1518*a* and 1518*h* are associated with area "A," objects 1518*d* and 1518*e* are associated with area "B," objects 1518*b* and 1518*f* are associated with area "C" and objects 1518*c* and 1518*g* are associated with area "D". As the bonus game is played, the player 1520, on the opposite side of the player 1522 controlling the hook 1530, views the objects 1518*a-d* moving towards him or her and is able to verbally or visually guide the player 1522 to move the virtual hook 1530 in order to "hook" an object, such as the fish 1518*h*.

In this implementation, the objects 1518*a-d* are only seen by player 1520 as they move toward player 1520, while player 1522 will only see objects 1518*a-d* when they move away from or pass player 1520. To do so, the portion of the layer 1516 corresponding to the lanes marked A-D in FIG. 15 is rendered opaque so that the player 1522 cannot see through that area of the display 1514. The objects 1518*e-g* are out of the view of the player 1520 and are now only seen by player 1522. The depictions in FIG. 15 of the objects 1518*a-h* as being outside of (i.e., to the left and right of) the displays 1512, 1514 are meant only to illustrate that the objects 1518*a-d* are seen by the player 1520 only as they are coming toward the player 1520 and that the objects 18*e-h* are seen by the player 1522 only as they are moving away from the player 1522. The three-dimensional objects 1518*a-h* are actually viewed by the players 1520, 1522 as they are looking at the displays 1512, 1514. In other words, the objects 1518*a-h* will not be "hovering" above the heads of the players 1520, 1522 as depicted in FIG. 15 but will be displayed as three-dimensional renderings on the display 1512, 1514. In this particular example, with the help of player 1520, the player 1522 attempts to cause a fish to follow the hook 1530 until a fish, i.e., object 1518*h*, hooks on (based on a game-terminating selection) and all fish that follow the hook 1530 will be "caught." Player 1520 or player 1522 or both are awarded an amount based on the hook multiplier.

To help players view other players on opposite sides of the gaming machines 1510*a-d*, a portion of the displays 1512, 1514 may be rendered transparent via the variable opacity layer 1516 in this implementation to permit the players to see one another through the displays 1512, 1514. In FIG. 15, this portion 1532 includes a bottom area of the displays 1512, 1514 such that players 1520, 1522 can view each other's expressions and gesticulations while playing the wagering game. This provides an advantage for players to use the knowledge, skill and experience of other players to win higher awards. In some embodiments, the portion 1532 may not become transparent until the player 1522 hooks a fish. At this point, the player 1522 can view the game outcome, which was previously only seen by player 1520. In yet other embodiments, other portions of the displays 1512, 1514 may be rendered transparent so that players can view each other through the displays 1512, 1514 at various times during play of the wagering game. Additionally, various other wagering games (in addition to wagering games having an aquarium/ocean theme) may be used or adapted for use with the aspects described herein.

Alternately, the displays 1512, 1514 may not be transparent and the layer 1516 is disposed in the area below the displays 1512, 1514. In this implementation, what is revealed to the players 1520, 1522 is controlled by what is selected to be displayed on either or both of the displays 1512, 1514. The controllable layer below the displays allows the players on opposite sides to see one another and also permits unimpeded line-of-sight through the gaming system shown in FIG. 15.

The electro-optical assemblies disclosed herein create exciting and eye-catching new possibilities for gaming machines. They may be used as signage to attract players and because the electro-optical assemblies can be rendered transparent, they may avoid height restrictions imposed in some jurisdictions. Emergency exits can still be viewed through the transparent layer, and existing sightlines will not be disrupted by installation of gaming machines fitted with electro-optical assemblies as disclosed herein.

The electro-optical assemblies may also be installed in areas where a conventional display would be a distraction or an obstruction because they are not transparent, such as during a sporting event, a show, a horse race, and the like. With such a see-through display on which video images may be displayed or projected, spectators may place wagers on and play wagering games during the event while watching the event without having their view obstructed. For example, during a concert or a Big Ten game, spectators may play a slot wagering game on the see-through display while still watching the concert or game through the see-through display. Important messages or other actions requiring the player's undivided attention may be displayed while the see-through display is rendered opaque, thereby temporarily blocking the player's view of the event.

For each of the embodiments described herein, the player input devices, the display and the electro-optical assembly may be included in a single cabinet.

Each of these embodiments and obvious variations thereof is contemplated as falling within the spirit and scope of the claimed invention, which is set forth in the following claims.

What is claimed is:

1. A gaming system comprising:

a cabinet;

a first input device for receiving a wager from a first player;

a second input device for receiving a wager from a second player;

at least one video display for displaying video images relating to a wagering game;

an electro-optical assembly in the cabinet, the electro-optical assembly comprising a substrate and a layer having a variable opacity, the layer being positioned to reflect the video images displayed from the at least one video display; and a controller programmed to alter the opacity of the layer to allow the first player to view the video images displayed from the at least one display and reflected off of the layer.

2. The gaming system of claim 1, wherein the at least one video display includes two video displays, wherein the first video display is positioned on one side of the electro-optical assembly and the second video display is positioned on an opposing side of the electro-optical assembly.

3. The gaming system of claim 1 wherein the controller is further programmed to alter the opacity of the layer such that the first player is able to view the second player through the substrate and vice versa and wherein the controller is further programmed to alter the opacity of the layer such that the first player is unable to view the second player through the substrate and vice versa.

4. The gaming system of claim 1, where the electro-optical assembly includes a suspended particle device, a liquid crystal device, or an electrochromic device.

5. The gaming system of claim 1, wherein the at least one video display includes a first video projector for projecting the video images onto the electro-optical assembly, the video images being visible to the first player and the second player when the layer is opaque, and the first player and the second player being able to view one another when the layer is transparent or translucent.

6. The gaming system of claim 5, wherein the video images include a first set of video images and a second set of video images, the at least one display includes a second video projector for projecting the second set of video images onto the electro-optical assembly, the first set of video images being projected by the first video projector onto the electro-optical assembly.

7. The gaming system of claim 1, further comprising a transparent touchscreen in communication with the electro-optical assembly such that the first and second players can view respective selections made by the other player and presented visually via the at least one video display to the first player or the second player.

8. The gaming system of claim 1, where the electro-optical assembly is a transmissive display.

9. A method of conducting a wagering game on a gaming system, the method comprising the acts of:

providing a first gaming machine for receiving a wager from a first player and a second gaming machine for receiving a wager from a second player;

interposing an electro-optical assembly between the first and second gaming machines, the electro-optical assembly comprising a substrate and a layer having variable opacity;

electronically coupling a controller to the layer; and programming the controller to vary the opacity of the layer for displaying video images of a wagering game relative to the substrate.

10. The method of claim 9, wherein the video images are superimposed relative to the substrate via a first display and a second display.

11. The method of claim 9, further comprising varying the opacity of the layer such that the first player is able to view the second player through the substrate and vice versa.

12. The method of claim 9, wherein the electro-optical assembly comprises at least one screen having variable opacity for superimposing video images from at least one display, the at least one display comprising at least one projector for projecting the video images relative to the screen as the screen becomes opaque.

13. The method of claim 9, further comprising providing a transparent touchscreen in communication with the electro-optical assembly such that the first and second players can view respective selections made by the other player.

14. A gaming system comprising:

a linked set of gaming machines operable to receive wagers from players, the linked set of gaming machines including signage in communication with the gaming machines; and a controller operative to control the signage to allow players at the linked set of gaming machines to view players at the other linked gaming machines through the signage, and to superimpose video images on the signage corresponding to a community wagering game.

15. A multi-player gaming system comprising:

a cabinet;

a first input device for receiving a wager from a first player;

a second input device for receiving a wager from a second player;

at least one video display for displaying video images relating to a wagering game;

an electro-optical assembly in the cabinet comprising a substrate and a layer having a variable opacity, the electro-optical assembly being positioned to permit the video images displayed from the at least one video display to be viewable relative to the layer, a viewable surface of the electro-optical assembly having a plurality of variable zones, including a first zone adjacent to a second zone; and a controller programmed to alter the opacity of the layer corresponding to the first zone separately from the opacity of the layer corresponding to the second zone.

16. The multi-player gaming system of claim 15, further comprising at least one touch screen adjacent the electro-optical assembly for receiving player inputs, wherein the touch screen is controlled by the controller such that selections made via the touch screen in the first zone are associated with the first player and selections made via the touch screen in the second zone are associated with the second player.

17. The multi-player gaming system of claim 15, wherein the opacity of the layer is altered by the controller such that at least one of the video images is displayed across the first zone and the second zone to create a shared video image, and wherein the first player and the second player can interact with the shared video image.

18. The multi-player gaming system of claim 15, wherein the electro-optical assembly includes a plurality of layers, each layer having a variable opacity controlled by the controller, a first of the plurality of layers corresponding to the first zone and a second of the plurality of layers corresponding to the second zone.

19. The multi-player gaming system of claim 15, wherein at least one video image is viewable on opposite sides of the electro-optical assembly.

20. The multi-player gaming system of claim 15, wherein the video display includes a projector for reflecting the video images off of the layer.

21. The multi-player gaming system of claim 15, wherein the electro-optical assembly further comprises a third zone and a fourth zone and wherein the controller is programmed to alter the opacity of the layer corresponding to the third zone separately from the opacity of the layer corresponding to the fourth zone.

22. The multi-player gaming system of claim 21, wherein the opacity of the layer corresponding to the third zone and the opacity of the layer corresponding to the fourth layer are controlled separately from the opacity of the layer corresponding to the first zone and from the opacity of the layer corresponding to the second zone.

23. The multi-player gaming system of claim 21, further comprising at least one touch screen adjacent the electro-optical assembly for receiving player inputs, wherein the touch screen is controlled by the controller such that selections made via the touch screen in the third zone are associated with the third player and selections made via the touch screen in the fourth zone are associated with the second player.

24. A gaming system comprising:

a cabinet;

a first input device for receiving a wager from a first player;

a second input device for receiving a wager from a second player;

at least one video display for displaying video images relating to a wagering game;

an electro-optical assembly in the cabinet, the electro-optical assembly comprising a substrate and a layer having a variable opacity, the layer being positioned to permit the video images displayed from the at least one video display to be viewable relative to the layer; and a controller programmed to alter the opacity of the layer to allow the first player and the second player to view the video images displayed by the at least one display, wherein at least one video image related to the wagering game is viewable simultaneously by the first player and the second player when they are on opposite sides of the electro-optical assembly, and wherein the first player and the second player can interact directly with the at least one video image related to the wagering game.

25. The multi-player gaming system of claim 24, further comprising a first touch screen located on one side of the electro-optical assembly and a second touch screen located on the opposite side of the electro-optical assembly, and wherein the first player and the second player interact directly with the at least one video image via the first touch screen and the second touch screen, respectively, at the same location on opposite sides of the electro-optical assembly.

26. The multi-player gaming system of claim 24, wherein the controller is further programmed to receive a selection corresponding to the at least one video image from the first player and a selection corresponding to the at least one video image from the second player, and, responsive thereto, execute a function relating to the wagering game; and wherein the controller is further programmed to cause the at least one video image to change appearance in response to the first player interacting with the at least one video image to produce a changed video image, the changed video image being viewable by both the first player and the second player.

27. The multi-player gaming system of claim 24, wherein the first player and the second player input a shared wager based on the mutual interaction with the at least one video image.

28. A method of conducting a multi-player wagering game, comprising:

receiving a wager from a first player of the wagering game;

receiving a wager from a second player of the wagering game;

varying, via a controller, an opacity of a layer of an electro-optical assembly to render the layer between opaque and transparent;

displaying at least one video image relative to the layer such that the at least one video image is visible through the layer to the first player and to the second player; and receiving an input from the first player indicative of a selection related to the wagering game by the first player and receiving an input from the second player indicative of the selection by the second player.

29. The method of claim 28, wherein the varying includes rendering the opacity of the entire layer opaque in response to the first player or the second player not achieving an award during the wagering game.

30. The method of claim 28, wherein the displaying the at least one video image causes the at least one video image to appear simultaneously in a first orientation to the first player and in a second orientation that is reversed from the first orientation to the second player, the at least one video image including a video animation relating to the wagering game.

* * * * *